United States Patent [19]
Mizuno et al.

[11] Patent Number: 6,016,239
[45] Date of Patent: Jan. 18, 2000

[54] TRANSDUCER APPARATUS INCLUDING TRANSDUCER WITH RECORDING MEDIUM CONTACT LINE PERPENDICULAR TO TRANSDUCER PIVOT AXIS

[75] Inventors: Osamu Mizuno, Osaka; Hisayuki Enshu, Kyoto; Tohru Nakamura, Katano, all of Japan

[73] Assignee: Matsushita Electric Industrial Co., Ltd., Osaka, Japan

[21] Appl. No.: 09/051,220

[22] PCT Filed: Oct. 4, 1996

[86] PCT No.: PCT/JP96/02895

§ 371 Date: Jul. 2, 1998

§ 102(e) Date: Jul. 2, 1998

[87] PCT Pub. No.: WO97/14140

PCT Pub. Date: Apr. 17, 1997

[30] Foreign Application Priority Data

Oct. 9, 1995 [JP] Japan ................................. 7-261272

[51] Int. Cl.[7] .......................................................... G11B 5/48
[52] U.S. Cl. ............................................ 360/104; 360/103
[58] Field of Search ................................... 360/103, 104, 360/106, 114; 369/13, 222

[56] References Cited

U.S. PATENT DOCUMENTS

| | | | |
|---|---|---|---|
| 5,291,361 | 3/1994 | Yokota | 360/106 |
| 5,339,208 | 8/1994 | Yumura et al. | 360/104 |
| 5,428,489 | 6/1995 | Takamure et al. | 360/104 |
| 5,467,237 | 11/1995 | Takahashi | 360/114 |
| 5,483,504 | 1/1996 | Horita et al. | 369/13 |
| 5,488,527 | 1/1996 | Komori et al. | 360/122 |
| 5,508,863 | 4/1996 | Goto et al. | 360/104 |
| 5,541,789 | 7/1996 | Fukuoka et al. | 360/104 |
| 5,650,894 | 7/1997 | Ikeda | 360/104 |
| 5,694,270 | 12/1997 | Sone et al. | 360/104 |
| 5,761,001 | 6/1998 | Watanabe et al. | 360/103 |
| 5,841,608 | 11/1998 | Kasamatsu et al. | 360/103 |
| 5,859,748 | 1/1999 | Itoh | 360/103 |

FOREIGN PATENT DOCUMENTS

| | | |
|---|---|---|
| 0 524 629 | 1/1993 | European Pat. Off. . |
| 0 657 879 | 6/1995 | European Pat. Off. . |
| 5-242621 | 9/1993 | Japan . |

*Primary Examiner*—Jefferson Evans
*Attorney, Agent, or Firm*—Wenderoth, Lind & Ponack, L.L.P.

[57] ABSTRACT

A transducer supporting apparatus (K1–K7) comprises: a transducer (11, 12) which confronts a recording medium (1) and is moved relative to the recording medium (1) in a direction (R) so as to record and reproduce information on the recording medium (1); a slider (21–27) which is coupled with the transducer (11, 12) and includes a projecting member (21a–25a; 26a, 26b; 27a, 27b) protruding towards the recording medium (1); a pivot member (31–33; 35–37) for pivotally supporting the slider (21–27) so as to pivot the slider (21–27) about a pivot axis (x-axis) substantially parallel to the recording medium (1) and at least not parallel to a contact line (C) between the projecting member (21a–25a; 26a, 26b; 27a, 27b) and the recording medium (1); and a loading member (31–33; 35–37) for depressing the projecting member (21a–25a; 26a, 26b; 27a, 27b) against the recording medium (1); wherein the contact line (C) is oriented in a direction other than the direction (R) of relative movement between the recording medium (1) and the transducer (11, 12).

31 Claims, 17 Drawing Sheets

TRANSDUCER APPARATUS INCLUDING TRANSDUCER WITH RECORDING MEDIUM CONTACT LINE PERPENDICULAR TO TRANSDUCER PIVOT AXIS

TECHNICAL FIELD

The present invention generally relates to transducer supporting apparatuses for supporting transducers of a type brought into sliding contact with a medium, for example, a magnetic head and more particularly, to a transducer supporting apparatus for supporting a transducer such as a sliding contact type magnetic head of a magnetic recording apparatus and a magnetooptical recording and reproducing apparatus which are used as an external storage of an electronic computer, a recording and reproducing apparatus for recording and reproducing musical and image signals and other information, etc.

BACKGROUND ART

Conventionally, magnetic tapes or flexible disks have been mainly employed for magnetic recording of a type in which a magnetic head is used as a transducer so as to be brought into sliding contact with a medium. However, in recent years, so-called mini disks have become popular for musical magnetooptical recording. In order to provide a transducer supporting apparatus in which magnetooptical overwriting can be easily performed through modulation of a magnetic field, the mini disks are arranged for use with a sliding contact type magnetic head and a sliding contact film for sliding contact with the magnetic head is formed on the medium.

One sliding contact type magnetic heads for magnetooptical recording, in which a medium is slid not continuously but only at the time of start and stop of the magnetic head is known from Japanese Patent Laid-Open Publication No. 4-132060 (1992). In this known magnetic head, one face of a slider confronting a disk acting as a magnetooptical recording medium is flat and is formed by resinous material having excellent wear resistance and lubricating properties such that wear and damage of the slider and the disk are prevented.

Meanwhile, one suspension applicable to the above mentioned known magnetic head is well known from Japanese Patent Laid-Open Publication No. 55-22296 (1980). This prior art suspension includes a gimbals having two degrees of freedom for causing the slider to follow tilt of the disk and a load beam for producing a load for depressing the slider against the disk.

However, these conventional magnetic heads have the following drawbacks. Namely, since the gimbals for causing the flat slider to follow the disk should have at least two rotational axes requiring accurate formation, inexpensive manufacturing techniques such as pressing cannot be employed for producing the gimbals, so that the gimbals becomes quite expensive, thereby resulting in increased production cost of the transducer supporting apparatus.

Meanwhile, the gimbals referred to above can be naturally rotated also in a pitching direction relative to a sliding direction of the disk. Therefore, if the disk is slid improperly, the slider is likely to be, so to speak, plunged into the disk, thus causing great damage to the disk.

Furthermore, due to minute pitching motions of the gimbals, stick slip phenomenon, i.e., vibrations caused by variations of frictional force happen readily, so that frictional force becomes unstable and thus, durability of the disk deteriorates, thereby resulting in reduced reliability of the transducer supporting apparatus.

SUMMARY OF THE INVENTION

Accordingly, the present invention has for its object to provide, with a view to eliminating the above mentioned disadvantages of the prior art, a transducer supporting apparatus in which a medium is slid stably without pitching motions of a gimbals and which can be produced easily at low cost.

In order to accomplish this object, a transducer supporting apparatus according to the present invention comprises: a transducer which confronts a recording medium and is moved relative to the recording medium in a direction so as to record and reproduce information on the recording medium; a sliding means which is coupled with the transducer and includes a projecting member protruding towards the recording medium; wherein when the projecting member is brought into contact with the recording medium, a substantially straight contact region is formed between the projecting member and the recording medium and a segment extending through a longitudinal central axis of the contact region and bounded by opposite ends of the contact region is defined as a contact line; a pivot means for pivotally supporting the sliding means so as to pivot the sliding means about a pivot axis substantially parallel to the recording medium and substantially perpendicular to the contact line; and a loading means for depressing the projecting member against the recording medium; wherein the contact line is oriented in a direction substantially perpendicular to the direction of relative movement between the recording medium and the transducer.

By this arrangement of the transducer supporting apparatus of the present invention, the sliding means can be pivoted only about the axis substantially perpendicular to the contact line and is not pivoted about an axis parallel to the contact line. Since moment caused by frictional force between the projecting member and the recording medium due to relative movement between the recording medium and the transducer is applied about the axis parallel to the contact line, the sliding means is not pivoted by this moment and thus, unstable pitching motions of the sliding means due to the frictional force do not occur. Meanwhile, in case the recording medium is tilted about the axis substantially perpendicular to the contact line, the sliding means is pivoted by the pivot means so as to cause the transducer to follow the recording medium. On the other hand, in case the recording medium is tilted about the axis parallel to the contact line, the sliding means is not tilted but the projecting member follows the recording medium so as to cause the transducer to follow the recording medium.

This object and features of the present invention will become clear from the following description taken in conjunction with the preferred embodiments thereof with reference to the accompanying drawings throughout which like parts are designated by like reference numerals.

DETAILED DESCRIPTION OF THE INVENTION

Figure 1:
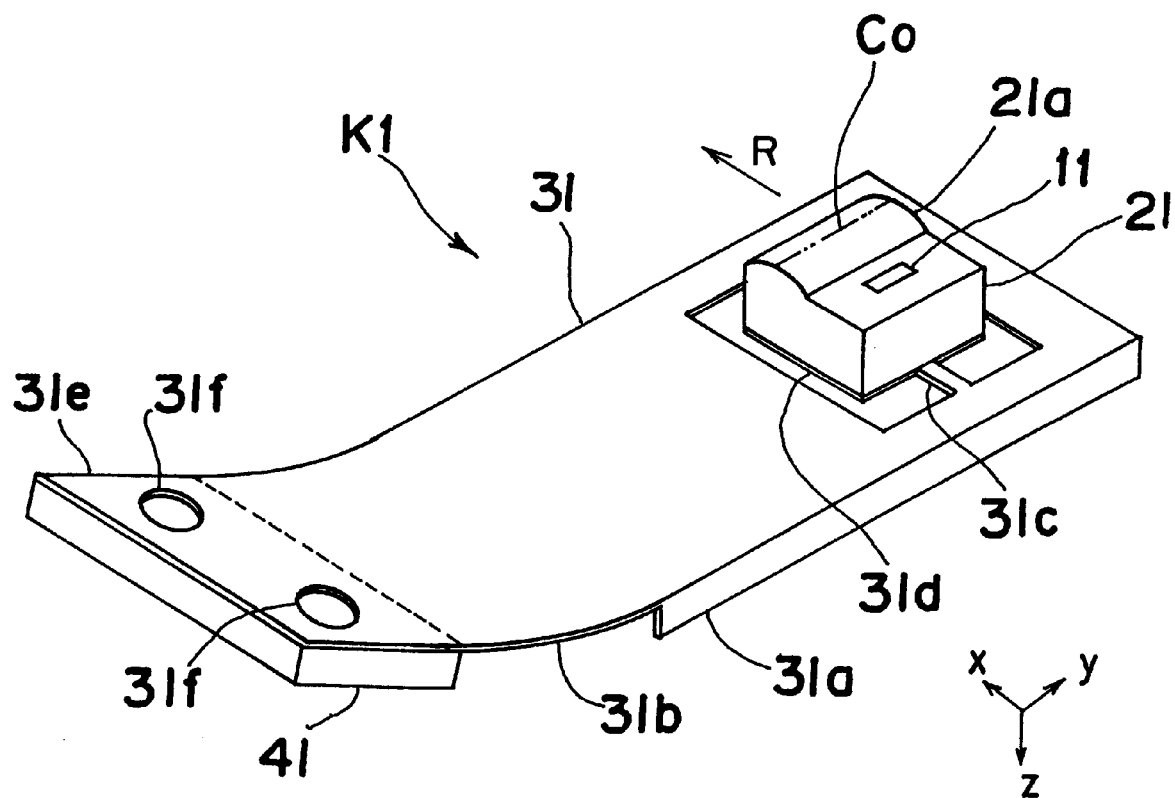
FIG. 1 is a perspective view of a transducer supporting apparatus according to a first embodiment of the present invention.

Hereinafter, preferred embodiments of the present invention are described with reference to the attached drawings. Initially, a transducer supporting apparatus K1 according to a first embodiment of the present invention is described with reference to FIG. 1 to FIG. 4B. In this embodiment, a magnetic head suitable for a sliding contact type magnetooptical disk 1 is recited as a transducer. A right-hand orthogonal system of coordinates is defined as shown in these figures. In FIGS. 2B and 3, the transducer supporting apparatus K1 is viewed in the plus direction of the x-axis and in the minus direction of the y-axis, respectively.

Figure 2A:
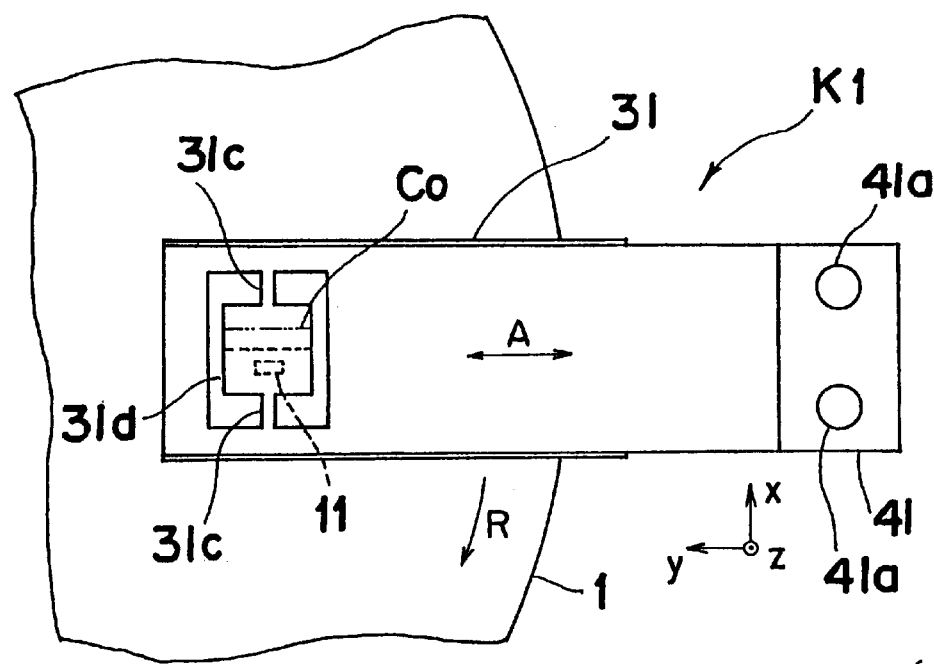
FIG. 2A is a top plan view of the transducer supporting apparatus of FIG. 1.
Figure 2B:
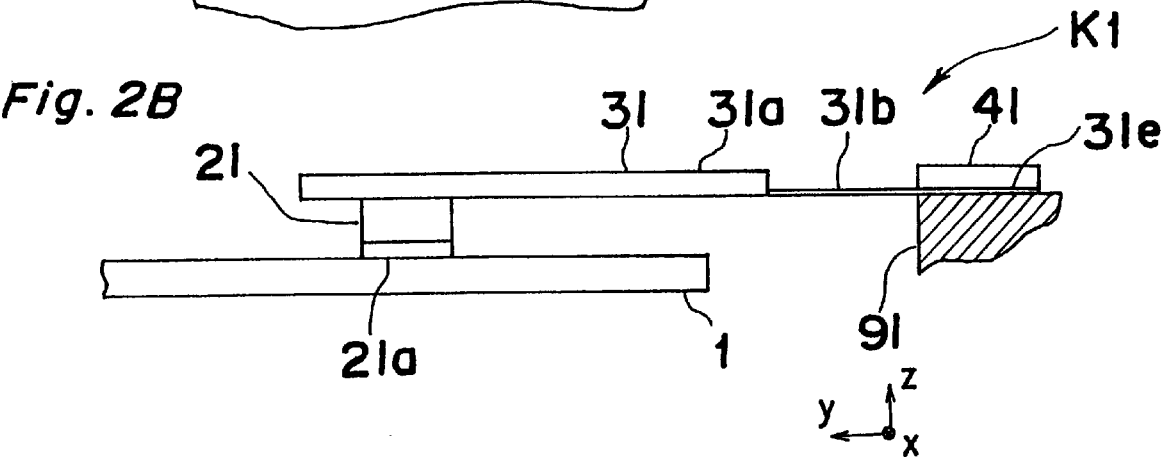
FIG. 2B is a side elevational view of the transducer supporting apparatus of FIG. 1.
Figure 3:
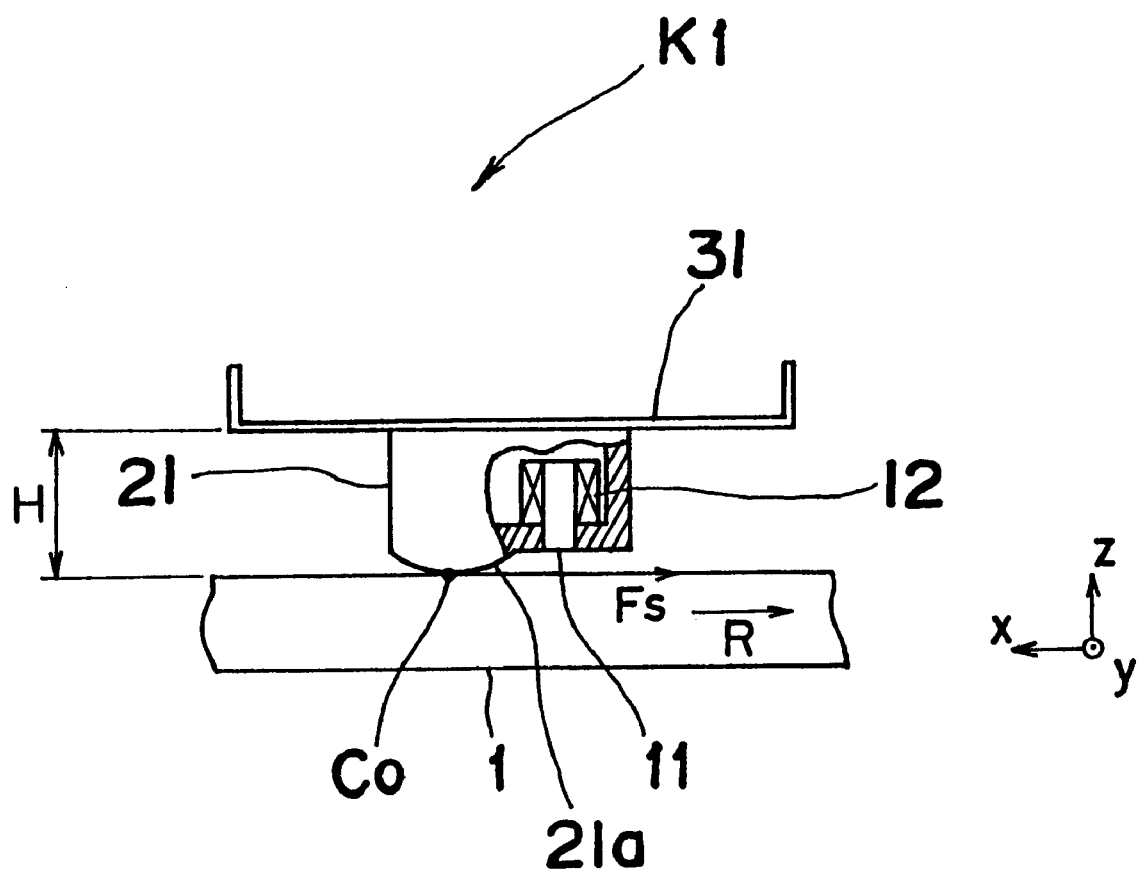
FIG. 3 is another partly sectional side elevational view of the transducer supporting apparatus of FIG. 1.

In FIGS. 2A and 2B, the magnetooptical disk 1 acts as a recording medium. A sliding contact surface suitable for sliding contact with the magnetic head is formed on one face of the magnetooptical disk 1 oriented in the plus direction of the z-axis. In FIG. 1, a slider 21 acting as a sliding means is formed by resin such as liquid crystal polymer, nylon, etc. A cylindrical surface 21a having a generating line extending in parallel with the y-axis is formed as a projection on one face of the slider 21 oriented in the minus direction of the z-axis. As shown in FIG. 3, the cylindrical surface 21a of the slider 21 is brought into sliding contact with the magnetooptical disk 1.

At the time the cylindrical surface 21a is brought into contact with the magnetooptical disk 1, a substantially straight contact region extending in parallel with y-axis is formed therebetween. A segment extending through a center of this contact region and bounded by opposite ends of the contact region is referred to as a contact line C. In case the magnetooptical disk 1 is free from defective flatness, etc., the contact line C is defined as a contact line $C_0$ as shown in FIG. 1.

As shown in FIGS. 1 and 3, a magnetic core 11 and a coil 12 are mounted on the slider 21 so as to constitute the magnetic head acting as the transducer in this embodiment. The coil 12 is a source of magnetomotive force for imparting a magnetic field to the magnetooptical disk 1, while the magnetic core 11 is formed by a ferrite piece for guiding magnetic flux from the coil 12 to the magnetooptical disk 1. The magnetic core 11 is disposed at a location spaced a predetermined distance from the cylindrical surface 21a in the direction of the x-axis.

As the magnetic core 11 comes closer to the magnetooptical disk 1, a ratio of strength of magnetic field imparted to the magnetooptical disk 1 to magnitude of electric current flowing through the coil 12 is increased further, namely, efficiency is improved. However, for the following reason, it is not preferable that the magnetic core 11 is held in contact with the magnetooptical disk 1. Namely, if the magnetooptical disk 1 is brought into sliding contact with a hard member such as the magnetic core 11, the magnetooptical disk 1 is readily subjected to wear and damage. Therefore, the resinous cylindrical surface 21a projects further by a predetermined amount in the minus direction of the z-axis than the magnetic core 11 so as to prevent contact of the magnetic core 11 with the magnetooptical disk 1.

In FIG. 1, a load beam 31 acts not only as a loading means for depressing the slider 21 against the magnetooptical disk 1 but as a pivot means for causing the slider 21 to follow the tilt, etc. of the magnetooptical disk 1. The load beam 31 is preferably formed by a stainless steel sheet having a thickness of about 0.03 to 0.2 mm. More specifically, the load beam 31 may be formed by SUS 301-CSP or SUS 304-CSP specified for cold rolled stainless steel strip for spring by the Japanese Industrial Standards (JIS). The load beam 31 is constituted by a rigid portion 31a having large rigidity about the x-axis to bending, a load generating portion 31b and a flat platelike fixing portion 31e extending continuously from the load generating portion 31b. The load generating portion 31b is formed by subjecting a flat platelike member to substantially cylindrical plastic deformation about the x-axis. The fixing portion 31e is provided for securing the transducer supporting apparatus K1 to a fixing base 91 shown in FIG. 2B. The loading means for depressing the slider 21 against the magnetooptical disk 1 is constituted by the rigid portion 31a, the load generating means 31b and the fixing portion 31e.

A square fixing plate 41 for increasing rigidity of the fixing portion 31e at the time the transducer supporting apparatus K1 is secured to the fixing base 91 is attached to the fixing portion 31e by spot welding, etc. Two screw holes 31f are formed in the fixing portion 31e and are continuously communicated with two screw holes 41a in the fixing plate 41, respectively. As shown in FIG. 2A, a flat platelike slider mounting portion 31d is provided, through a pair of gimbals 31c, at one end of the rigid portion 31a disposed at a plus side in the direction of the y-axis so as to be surrounded by an opening. Since the gimbals 31c have a small width in the direction of the y-axis and a quite small thickness in the direction of the z-axis, the slider mounting portion 31d is pivotally supported by the gimbals 31c so as to be pivoted about x-axis. The pivot means for causing the slider 21 to follow the tilt, etc. of the magnetooptical disk 1 is constituted by the rigid portion 31a, the gimbals 31c and the slider mounting portion 31d.

The slider 21 is mounted on the slider mounting portion 31d of the load beam 31 by techniques such as ultrasonic fusion bonding. Relative to the fixing portion 31e, the slider 21 has degrees of freedom of merely pivoting about the x-axis by action of the gimbals and translation substantially in the direction of the z-axis by action of the load generating portion 31b.

In FIG. 2A, the magnetooptical disk 1 is rotated in the direction of the arrow R. However, in the vicinity of the slider 21 in FIG. 1, the rotational direction R of the magnetooptical disk 1 can be regarded as a direction of movement of the magnetooptical disk 1 relative to the slider 21. Hence, hereinafter, character R is defined as the direction of movement of the magnetooptical disk 1. As shown in FIG. 2A, a pivotal central axis of the gimbals 31c extends perpendicularly to the contact line $C_0$ and is disposed at a center of the contact line $C_0$ in the direction of the y-axis. In the vicinity of the contact line $C_0$, the direction R of movement of the magnetooptical disk 1 extends perpendicularly to the contact line $C_0$.

In this embodiment, a longitudinal axis of the transducer supporting apparatus K1 extends from the slider 21 to the fixing plate 41 in parallel with the y-axis. This longitudinal axis of the transducer supporting apparatus K1 is defined as a main axis of the transducer supporting apparatus K1. In case the transducer supporting apparatus K1 is applied to the magnetooptical disk 1 as in this embodiment, the fixing base 91 is generally a structure extending continuously to an optical head (not shown). The fixing base 91 is accessible in a radial direction of the magnetooptical disk 1, namely, in the direction of the arrow A in FIG. 2A by a known radial feeding mechanism, i.e., a so-called seeking mechanism (not shown).

Since constructions of the gimbals 31, etc. of the load beam 31 are minute, it is difficult to employ excellent mass production methods such as blanking for manufacture of the load beam 31 and thus, rather expensive production methods such as etching should be employed for manufacture of the load beam 31.

Hereinafter, operation of the transducer supporting apparatus K1 of the above described arrangement is described. As shown in FIG. 2A, the transducer supporting apparatus K1 is disposed such that the main axis of the transducer supporting apparatus K1 extends in the radial direction of the magnetooptical disk 1. As a result, the contact line $C_0$ becomes parallel to the radial direction of the magnetooptical disk 1. When the transducer supporting apparatus K1 has been mounted on the fixing base 91 by using screws (not shown) or the like at the fixing portion 31e as shown in FIG. 2B, the cylindrical surface 21a of the slider 21 is brought into contact with the magnetooptical disk 1, so that the load generating portion 31b is elastically deformed to a substantially flat shape by force applied from the magnetooptical disk 1 to the slider 21 and thus, the rigid portion 31a becomes substantially parallel to the magnetooptical disk 1. As a result, the slider 21 is depressed against the magnetooptical disk 1 through the rigid portion 31a, the gimbals 31c and the slider mounting portion 31d by an elastic restoring force of the load generating portion 31b.

Initially, in case the magnetooptical disk 1 has neither displacement nor tilt due to defective flatness, etc., the cylindrical surface 21 is brought into contact with the magnetooptical disk 1 at the contact region in the vicinity of the contact line $C_0$ as shown in FIGS. 2A and 3. When the magnetooptical disk 1 is rotated about the z-axis in the direction of the arrow R in FIG. 2A by a spindle motor (not shown), the cylindrical surface 21a is brought into sliding contact with the magnetooptical disk 1. Since the fixing base 91 can be set in the direction of the arrow A of FIG. 2A, the slider 21 can be set to a desired location on the magnetooptical disk 1.

FIG. 3 shows sliding contact of the cylindrical surface 21a with the magnetooptical disk 1 in detail. Due to friction between the slider 21 and the magnetooptical disk 1, a sliding frictional force Fs is applied to the slider 21 in the minus direction of the x-axis, so that a moment about the y-axis is applied to the slider mounting portion 31d. Assuming that character H denotes a distance between the magnetooptical disk 1 and the slider mounting portion 31d as shown in FIG. 3, this moment is expressed by Fs×H. However, the slider mounting portion 31d is allowed to be pivoted only about the x-axis by action of the gimbals 31c but has quite large rigidity against the above mentioned moment about the y-axis and therefore, is not pivoted about the y-axis. Accordingly, since the attitude of the slider 21 is kept stable against the sliding frictional force Fs, undesirable pitching motions of the prior art do not occur in the slider 21. If the coil 12 is turned on in this state, a magnetic field for recording or erasure is imparted to the magnetooptical disk 1 via the magnetic core 11. Since recording itself on the magnetooptical disk 1 is well known, its description is abbreviated for the sake of brevity.

Figure 4A:
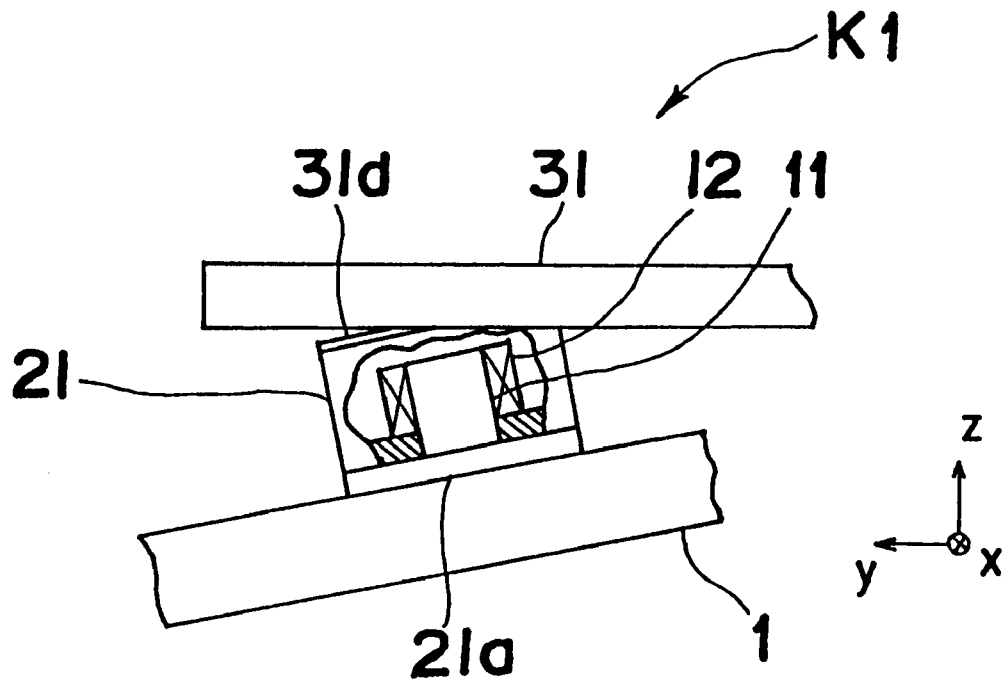
FIG. 4A is a view indicative of operation of the transducer supporting apparatus of FIG. 1.

Next, operation of the transducer supporting apparatus K1 in the case where the magnetooptical disk 1 is tilted due to its defective flatness, etc. will be described. In FIG. 4A, the transducer supporting apparatus K1 is viewed in the plus direction of the x-axis. FIG. 4A shows a state that the magnetooptical disk 1 is tilted about the x-axis, i.e., an axis not parallel to the contact line $C_0$. Since the slider 21 is depressed against the magnetooptical disk 1 by the elastic restoring force of the load generating portion 31b and can be pivoted about the x-axis by action of the gimbals 31c, the slider 21 is pivoted in accordance with tilt of the magnetooptical disk 1 while the cylindrical surface 21a and the magnetooptical disk 1 are being held in contact with each other as shown in FIG. 4A, so that the cylindrical surface 21a is held in stable sliding contact with the magnetooptical disk 1. As a result, the magnetic core 11 follows the magnetooptical disk 1 completely and thus, excellent efficiency of the transducer supporting apparatus K1 is maintained.

Figure 4B:
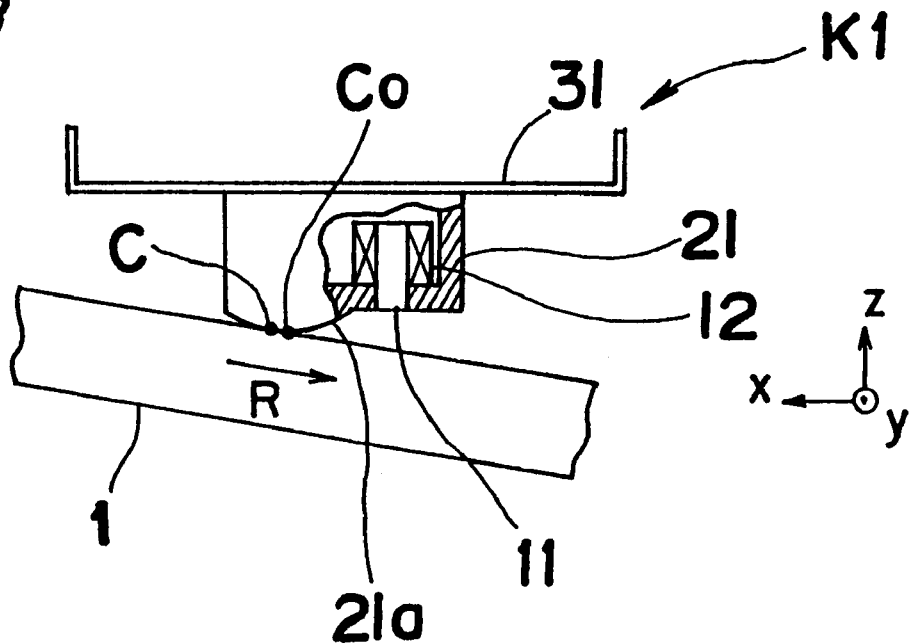
FIG. 4B is another view indicative of operation of the transducer supporting apparatus of FIG. 1.

In FIG. 4B, the transducer supporting apparatus K1 is viewed in the minus direction of the y-axis. FIG. 4B shows a state in which the magnetooptical disk 1 is tilted about the y-axis, i.e., an axis parallel to the contact line $C_0$. Since the slider 21 does not have a degree of freedom of pivoting about the y-axis, the slider 21 is not capable of following the tilt of the magnetooptical disk 1 about the y-axis. However, since the cylindrical surface 21a having the generating line extending in parallel with the y-axis is provided, the cylindrical surface 21a is brought into contact with the magnetooptical disk 1 along the contact line C different from the contact line $C_0$, so that the cylindrical surface 21a is held in stable sliding contact with the magnetooptical disk 1. At this time, the distance between the magnetic core 11 and the magnetooptical disk 1 varies slightly but this variation can be compensated for by supplying to the coil 12 electric current capable of producing sufficient magnetic field even in a state where the magnetic core 11 and the magnetooptical disk 1 are spaced farthest from each other.

As described above in this embodiment, the cylindrical surface 21a projects further towards the magnetooptical disk 1 than the magnetic core 11, the contact line $C_0$ between the cylindrical surface 21a and the magnetooptical disk 1 extends perpendicularly to the direction R of movement of the magnetooptical disk 1 and the pivotal axis of the gimbals 31c intersects with the contact line $C_0$ orthogonally. Accordingly, the slider 21 has the degree of freedom of pivoting about only the axis parallel to the direction R of movement of the magnetooptical disk 1. Meanwhile, since the pivot axis of the moment of the sliding frictional force Fs applied to the slider 21 intersects with the direction R of movement of the magnetooptical disk 1 orthogonally, unstable motions in the pitching direction such as stick slip do not occur in the slider 21. Consequently, the slider 21 is held in quite stable sliding contact with the magnetooptical disk 1.

Meanwhile, when the magnetooptical disk 1 is tilted about the axis parallel to the direction R of movement of the magnetooptical disk 1, the slider 21 is pivoted so as to follow the magnetooptical disk 1. On the other hand, when the magnetooptical disk 1 is tilted about the axis perpendicular to the direction R of movement of the magnetooptical disk 1, the slider 21 does not change its attitude and is held in stable sliding contact with the magnetooptical disk 1 along the specific contact line C.

Furthermore, in this embodiment, the pivot central pivot axis of the gimbals 31c extends perpendicularly to the contact line $C_0$ and is disposed at the center of the contact line $C_0$ in the direction of the y-axis. Therefore, even when the magnetooptical disk 1 is tilted slightly about the x-axis, difference between forces applied from opposite ends of the contact line C of the cylindrical surface 21a is uniformly applied, as a moment, to the gimbals 31c regardless of the tilting direction of the magnetooptical disk 1 and thus, the slider 21 follows the magnetooptical disk 1 promptly.

Meanwhile, in accordance with design conditions, the angle formed between the central pivot axis of the gimbals 31c and the contact line $C_0$ may deviate from 90° to such a degree that operating performances allow or the central pivot axis of the gimbals 31c may be spaced away from the center of the contact line $C_0$ in the direction of the y-axis.

In addition, in this embodiment, since the loading means and the pivot means are formed integrally in the load beam 31, production cost of the transducer supporting apparatus K1 can be lowered in comparison with a case in which the pivot means is provided additionally. It is needless to say that even if the pivot means is provided independently of the load beam 31, the transducer supporting apparatus K1 can function quite satisfactorily, which falls within scope of the present invention.

Figure 5:
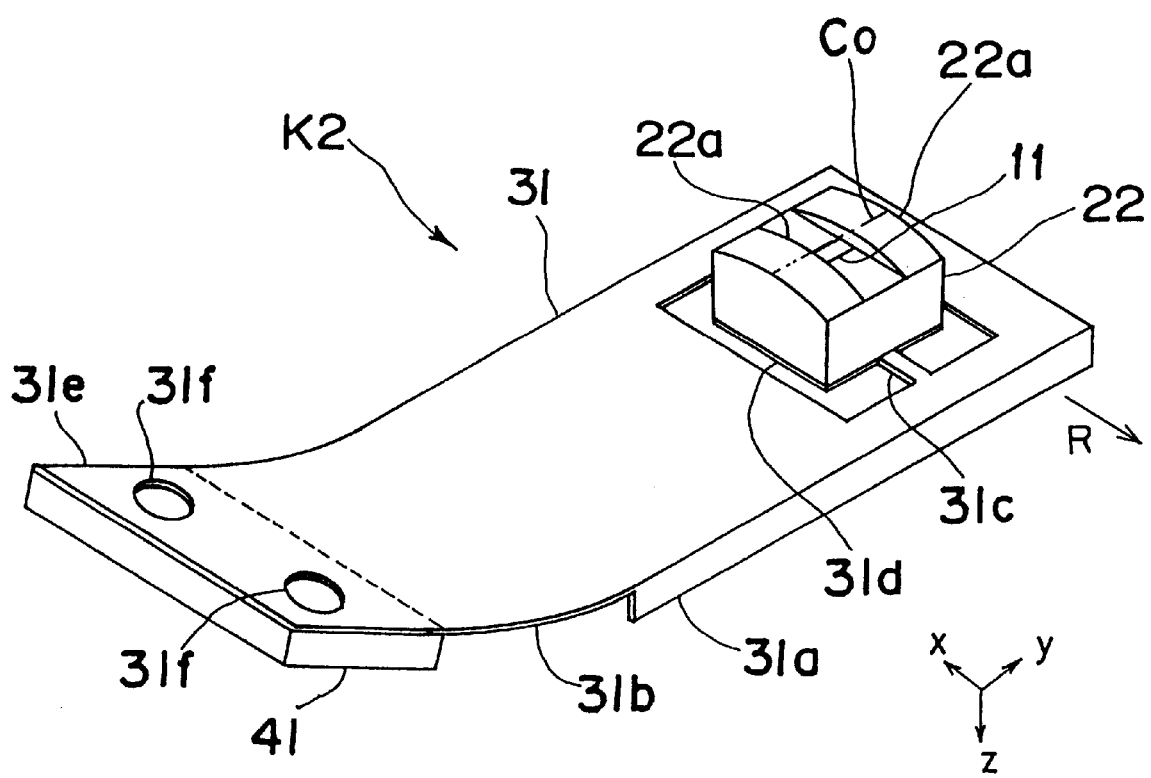
FIG. 5 is a perspective view of a transducer supporting apparatus according to a second embodiment of the present invention.
Figure 6A:
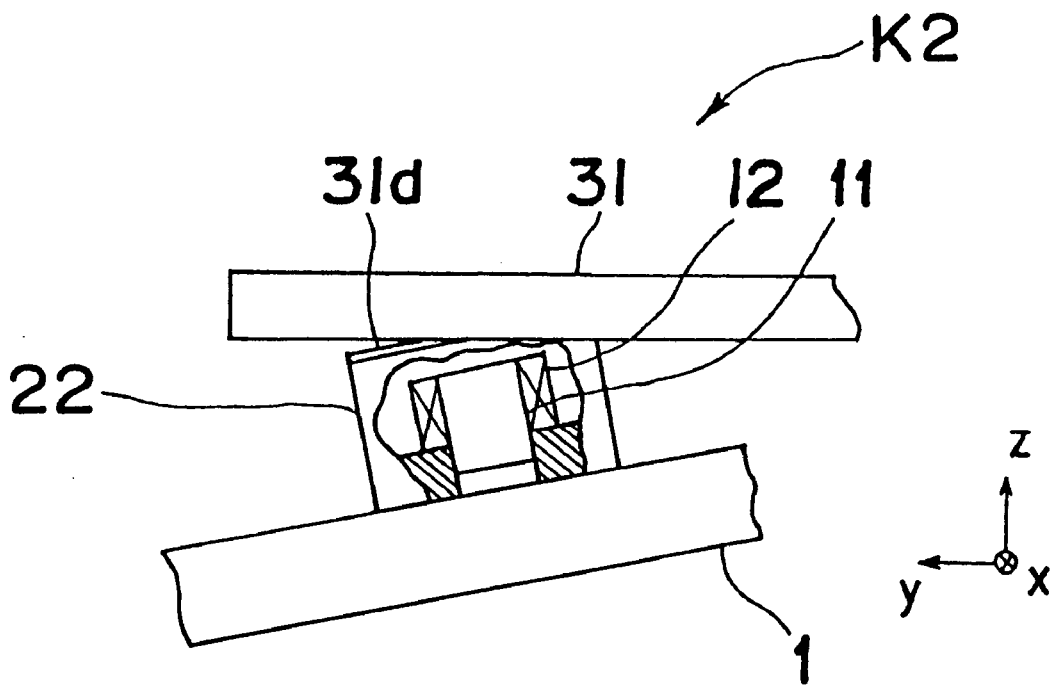
FIG. 6A is a view indicative of operation of the transducer supporting apparatus of FIG. 5.
Figure 6B:
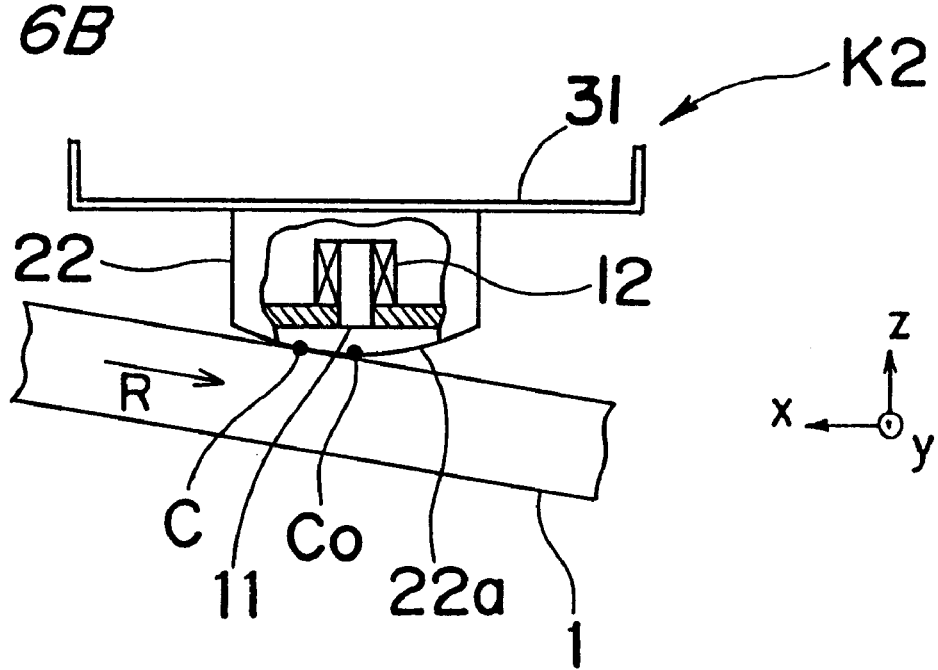
FIG. 6B is another view indicative of operation of the transducer supporting apparatus of FIG. 5.

Hereinafter, a transducer supporting apparatus K2 according to a second embodiment of the present invention is described with reference to FIGS. 5 to 6B. In the same manner as the transducer supporting apparatus K1, a magnetic head suitable for a sliding contact type magnetooptical disk is recited as a transducer also in this embodiment. A right-hand orthogonal system of coordinates is defined as shown in these figures. In FIGS. 6A and 6B, the transducer supporting apparatus K2 is viewed in the plus direction of the x-axis and in the minus direction of the y-axis. In FIGS. 5 to 6B, the magnetooptical disk 1, the magnetic core 11, the coil 12 and the fixing plate 41 of the transducer supporting apparatus K2 are the same as those of the transducer supporting apparatus K1.

A slider 22 is made of resinous material in the same manner as the slider 21 of the transducer supporting apparatus K1 and is mounted on the slider mounting portion 31d in the same manner as the transducer supporting apparatus K1. A pair of cylindrical surfaces 22a, each acting as a projection having a generating line extending in a direction parallel to the y-axis, are formed not only on one face of the slider 22 confronting the magnetooptical disk 1 and oriented in the minus direction of the z-axis but at opposite sides of the slider 22 in the direction parallel to the y-axis.

At the time the cylindrical surfaces 22a are brought into contact with the magnetooptical disk 1, two substantially straight contact regions extending in parallel with the y-axis are formed therebetween. A segment extending through a center of the two contact regions and bounded by opposite ends of the contact regions is referred to as a contact line C. In case the magnetooptical disk 1 is free from defective flatness, etc., the contact line C is defined as a contact line $C_0$ as shown in FIG. 5.

The magnetic core 11 and the coil 12 are mounted on the slider 22. The magnetic core 11 is disposed in the direction of the x-axis such that a center of an image of the magnetic core 11 projected on the magnetooptical disk 1 passes through the contact line $C_0$ as shown in FIG. 5.

Meanwhile, in the same manner as the transducer supporting apparatus K1, the cylindrical surfaces 22 project further towards the magnetooptical disk 1 than the magnetic core 11.

Furthermore, as will been seen from FIG. 5, a central pivot axis of the gimbals 31c extends perpendicularly to the contact line $C_0$ and is disposed at. a center of the contact line $C_0$ in the direction of the y-axis. The direction R of movement of the magnetooptical disk 1 extends perpendicularly to the contact line $C_0$.

In the same manner as the transducer supporting apparatus K1, the load beam 31 is secured to the fixing base 91 and the slider 22 is brought into contact, at the cylindrical surfaces 22a, with the magnetooptical disk 1.

Next, operation of the transducer supporting apparatus K2 of the above described arrangement is described. In this embodiment, a main axis of the transducer supporting apparatus K2 relative to the magnetooptical disk 1 and the direction R of movement of the magnetooptical disk 1 relative to the transducer supporting apparatus K2 are set in the same manner as the transducer supporting apparatus K1. Furthermore, since operation of the load beam 31 is the same as that of the transducer supporting apparatus K1, operation of the transducer supporting apparatus K2 at the time the magnetooptical disk 1 is not tilted is also the same as that of the transducer supporting apparatus K1 and thus, differences between operation of the transducer supporting apparatus K2 and that of the transducer supporting apparatus K1 are mainly described.

In FIG. 6A, the transducer supporting apparatus K2 is viewed in the plus direction of the x-axis. FIG. 6A shows a case in which the magnetooptical disk 1 is tilted about the x-axis, i.e., an axis not parallel to the contact line $C_0$. Since the slider 22 is depressed against the magnetooptical disk 1 by an elastic restoring force of the load generating portion 31b and the slider 22 is allowed to pivot about the x-axis by action of the gimbals 31c in the same manner as the transducer supporting apparatus K1, the slider 22 is pivoted in accordance with the tilt of the magnetooptical disk 1 while the cylindrical surfaces 22a and the magnetooptical disk 1 are being held in contact with each other, so that the slider 22 is held in stable sliding contact with the magnetooptical disk 1. As a result, since the magnetic core 11 follows the magnetooptical disk 1 completely, excellent efficiency of the transducer supporting apparatus K2 is maintained.

In FIG. 6B, the transducer supporting apparatus K2 is viewed in the minus direction of the y-axis. FIG. 6B shows a case in which the magnetooptical disk 1 is tilted about the y-axis, i.e., an axis parallel to the contact line $C_0$. Since the slider 22 does not have degree of freedom of pivoting about the y-axis, the slider 22 does not follow the tilt of the magnetooptical disk 1 about the y-axis. However, since the cylindrical surfaces 22a have a generating line parallel to the y-axis, the slider 22 is brought into contact with the magnetooptical disk 1 along the contact line C different from the contact line $C_0$ and thus, the slider 22 is held in stable sliding contact with the magnetooptical disk 1.

At this time, since the magnetic core 11 is disposed such that the center of the image of the magnetic core 11 projected on the magnetooptical disk 1 passes through the contact line $C_0$, variations of distance between the magnetic core 11 and the magnetooptical disk 1 are minimized even if the actual contact line is shifted to the arbitrary contact line C.

As described above in this embodiment, the two cylindrical surfaces 22a project further towards the magnetooptical disk 1 than the magnetic core 11 and the contact line $C_0$ between the cylindrical surfaces 22a and the magnetooptical disk 1 extends perpendicularly to the direction R of movement of the magnetooptical disk 1. Moreover, the pivot axis of the gimbals 31c intersects with the contact line $C_0$ orthogonally and the magnetic core 11 is disposed in the vicinity of the contact line $C_0$. As a result, in addition to the effect of the transducer supporting apparatus K1 that sliding contact of the slider 22 with the magnetooptical disk 1 is stabilized, such a remarkable effect also can be gained that variations of distance between the magnetic core 11 and the magnetooptical disk 1 at the time of tilt of the magnetooptical disk 1 about the axis parallel to the contact line $C_0$ are reduced sharply. As a result, efficiency in ratio of strength of magnetic field imparted to the magnetooptical disk 1 to magnitude of drive current flowing through the coil 12 is improved greatly.

Figure 7:
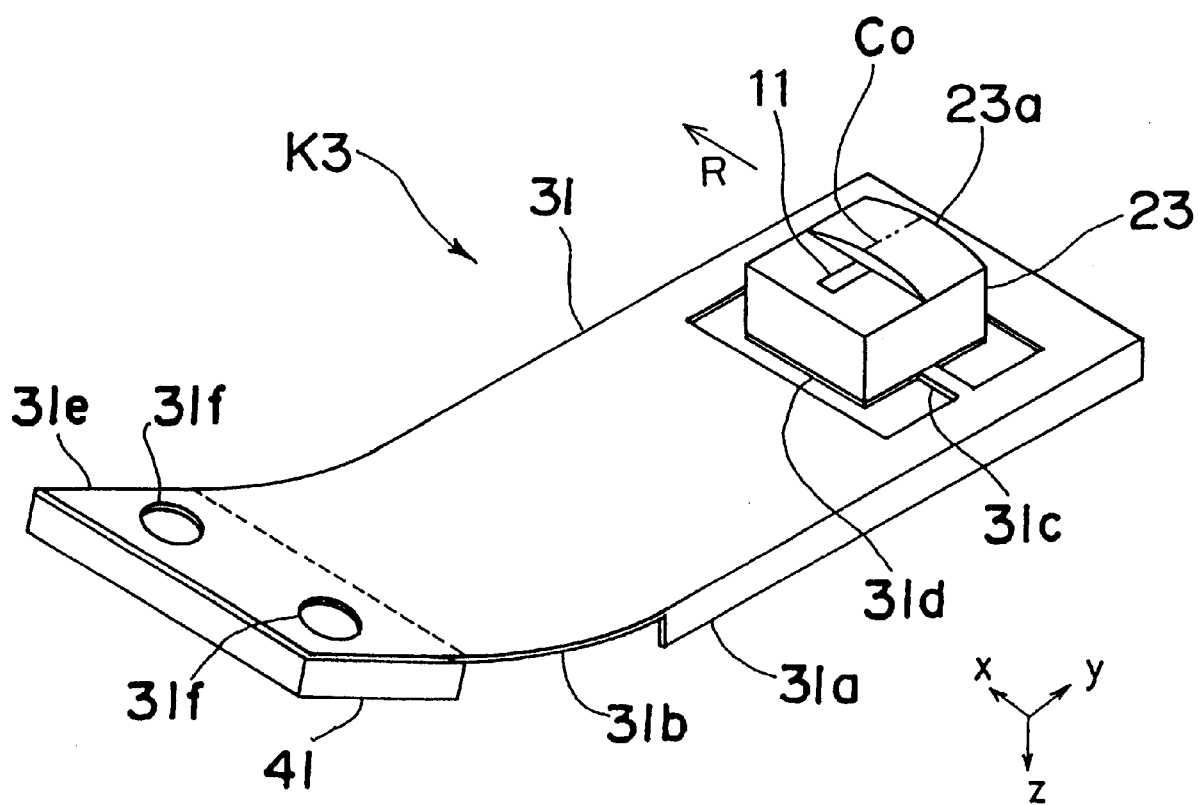
FIG. 7 is a perspective view of a transducer supporting apparatus according to a third embodiment of the present invention.
Figure 8:
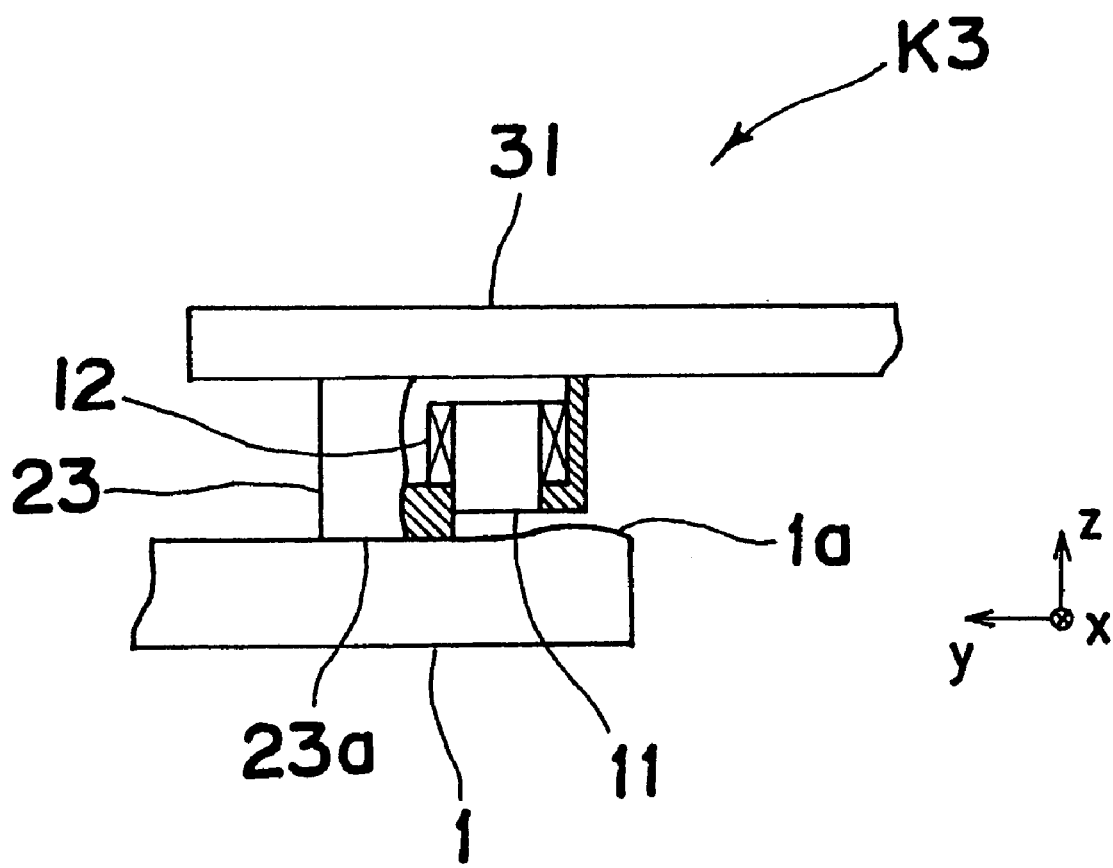
FIG. 8 is a view indicative of operation of the transducer supporting apparatus of FIG. 7.

Hereinafter, a transducer supporting apparatus K3 according to a third embodiment of the present invention is described with reference to FIGS. 7 and 8. In the same manner as the transducer supporting apparatus K1, a magnetic head suitable for a sliding contact type magnetooptical disk is recited as a transducer also in this embodiment. A right-hand orthogonal system of coordinates is defined as shown in these figures. In FIG. 8, the transducer supporting apparatus K3 is viewed in the plus direction of the x-axis. In FIGS. 7 and 8, the magnetooptical disk 1, the magnetic core 11, the coil 12, the load beam 31 and the fixing plate 41 are the same as those of the transducer supporting apparatus K1.

A slider 23 is made of resinous material in the same manner as the slider 21 of the transducer supporting apparatus K1 and is mounted on the slider mounting portion 31d in the same manner as the transducer supporting apparatus K1. A cylindrical surface 23a acting as a projection having a generating line extending in a direction parallel to the y-axis is formed on one face of the slider 23 confronting the magnetooptical disk 1 and oriented in the minus direction of the z-axis.

At the time the cylindrical surface 23a is brought into contact with the magnetooptical disk 1, a straight contact region extending in parallel with the y-axis is formed therebetween. A segment extending through a center of the contact region and bounded by opposite ends of the contact region is referred to as a contact line C. In case the magnetooptical disk 1 is free from defective flatness, etc., the contact line C is defined as a contact line $C_0$ as shown in FIG. 7.

The magnetic core 11 and the coil 12 are mounted on the slider 23. In the same manner as the transducer supporting apparatus K2, the magnetic core 11 is disposed in the direction of the x-axis such that a center of an image of the magnetic core 11 projected on the magnetooptical disk 1 passes through a prolongation of the contact line $C_0$ as shown in FIG. 7. Meanwhile, in the direction of the y-axis, the magnetic core 11 is disposed more adjacent to an outer periphery of the magnetooptical disk 1 than the cylindrical surface 23a, namely, more adjacent to the outer periphery of the magnetooptical disk 1 than the contact line $C_0$. In FIG. 7, the outer periphery of the magnetooptical disk 1 corresponds to the minus direction of the y-axis. Hence, the magnetic core 11 is disposed further in the minus direction of the y-axis than the contact line $C_0$. In the same manner as the transducer supporting apparatus K1, the direction R of movement of the magnetooptical disk 1 extends perpendicularly to the contact line $C_0$, a central pivot axis of the gimbals 31c extends perpendicularly to the contact line $C_0$. The cylindrical surface 23a projects further towards the magnetooptical disk 1 than the magnetic core 11. In the same manner as the transducer supporting apparatus K1, the load beam 31 is secured to the fixing base 91 and the slider 23 is depressed against the magnetooptical disk 1 such that the slider 23 is brought into contact, at the cylindrical surface 23a, with the magnetooptical disk 1.

Next, operation of the transducer supporting apparatus K3 of the above described arrangement is described. In this embodiment, a main axis of the transducer supporting apparatus K3 relative to the magnetooptical disk 1 and the direction R of movement of the magnetooptical disk 1 relative to the transducer supporting apparatus K3 are set in the same manner as the transducer supporting apparatus K1. Meanwhile, since operation of the load beam 31 is the same as that of the transducer supporting apparatus K1, operation of the transducer supporting apparatus K3 at the time the magnetooptical disk 1 is not tilted is also the same as that of the transducer supporting apparatus K1. Furthermore, in the same manner as the transducer supporting apparatus K2, the magnetic core 11 is disposed such that the center of the image of the magnetic core 11 projected on the magnetooptical disk 1 passes through the prolongation of the contact line $C_0$. Therefore, operation of the transducer supporting apparatus K3 at the time the magnetooptical disk 1 is tilted is also the same as that of the transducer supporting apparatus K2. Accordingly, differences between operation of the transducer supporting apparatus K3 and that of the transducer supporting apparatus K2 are mainly described.

Generally, a protective film, etc. for the recording medium such as the magnetooptical disk 1 are manufactured in a spinning method from a standpoint of its production cost. If the spinning method is employed, coated liquid rises slightly at an outermost periphery of the magnetooptical disk 1 and thus, a convex portion 1a is formed on the magnetooptical disk 1 as shown in FIG. 8. Since the shape of the convex portion 1a is nonuniform, the convex portion 1a makes sliding contact of the slider 23 with the magnetooptical disk 1 unstable. Even in the case in which the slider 23 is not adapted to be brought into sliding contact with the convex portion 1a positively, it may occur that the slider 23 reaches the convex portion 1a by overshooting a destination when the slider performs a seeking operation towards the outer periphery of the magnetooptical disk 1.

In this embodiment, since the magnetic core 11 is disposed more adjacent to the outer periphery of the magnetooptical disk 1 than the cylindrical surface 23a, the cylindrical surface 23a is held out of contact with the convex portion 1a and thus, the cylindrical surface 23a of the slider 23 can be held in stable sliding contact with the magnetooptical disk 1.

As described above in this embodiment, the cylindrical surface 23a projects further towards the magnetooptical disk 1 than the magnetic core 1 and the contact line $C_0$ between the cylindrical surface 23a and the magnetooptical disk 1 extends perpendicularly to the direction R of movement of the magnetooptical disk 1. In addition, the pivot axis of the gimbals 31c intersects with the contact line $C_0$ orthogonally and the magnetic core 11 is disposed in the vicinity of the contact line $C_0$ and more adjacent to the outer periphery of the magnetooptical disk 1 than the contact line $C_0$. Consequently, in addition to the effect of the transducer supporting apparatus K1 that sliding contact of the slider 23 with the magnetooptical disk 1 is stabilized and the effect of the transducer supporting apparatus K2 that the efficiency of magnetic field is improved, such marked effects also can be achieved that the transducer supporting apparatus K3 can be operated properly even if defective portions such as the convex portion 1a are formed at the outermost periphery of the magnetooptical disk 1 and that design allowance of the magnetooptical disk 1 is increased through increase of an outer peripheral margin of the magnetooptical disk 1 against overshooting of the slider 23.

Hereinafter, a transducer supporting apparatus K4 according to a fourth embodiment of the present invention is described with reference to FIGS. 9 to 11B. In the same manner as the transducer supporting apparatus K1, a magnetic head suitable for a sliding contact type magnetooptical disk is recited as a transducer also in this embodiment. A right-hand orthogonal system of coordinates is defined as shown in these figures. In FIG. 10B, the transducer supporting apparatus K4 is viewed in the plus direction of the y-axis. The transducer supporting apparatus K4 is viewed in the plus direction of the x-axis in FIG. 11A, while the transducer supporting apparatus K4 is viewed in the plus direction of the y-axis.

Figure 9:
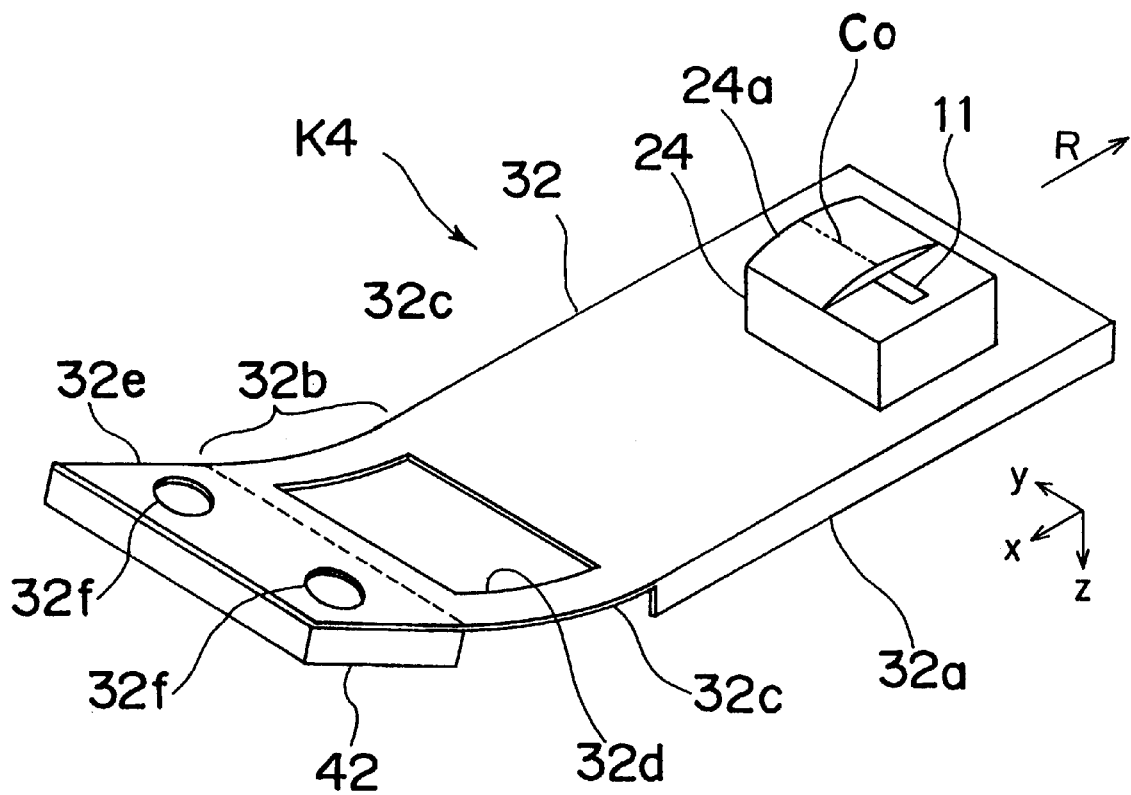
FIG. 9 is a perspective view of a transducer supporting apparatus according to a fourth embodiment of the present invention.
Figure 10A:
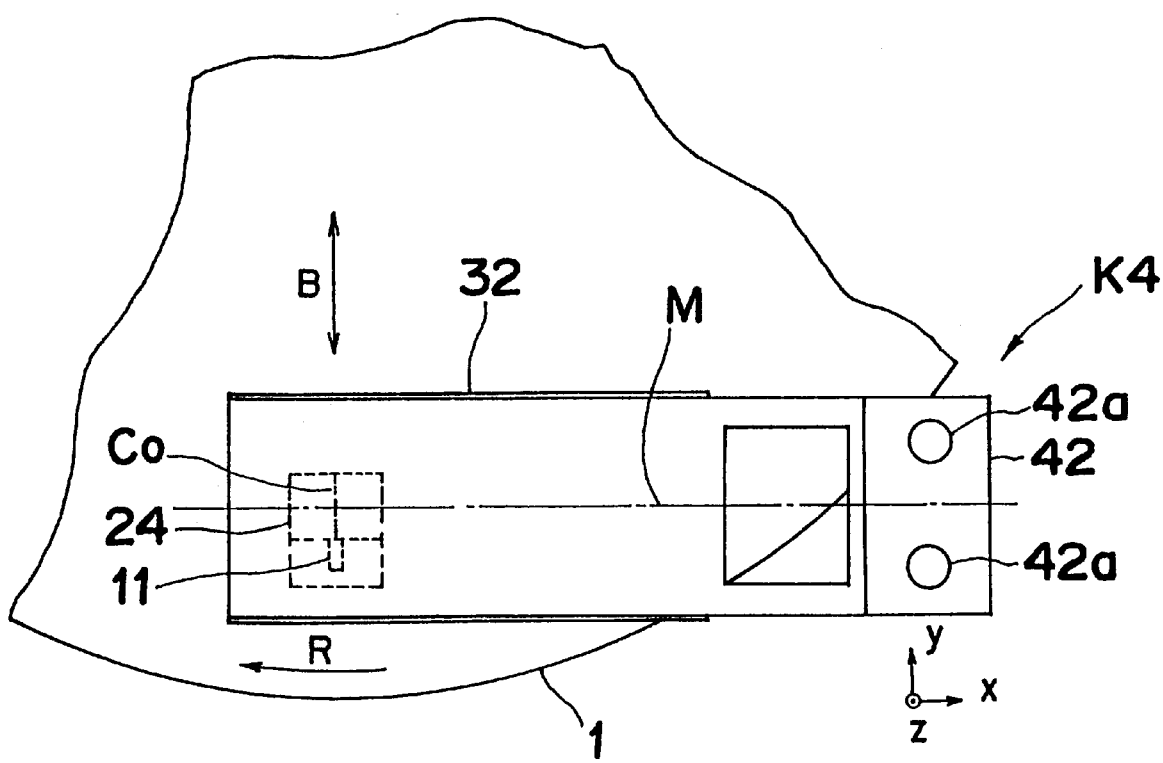
FIG. 10A is a top plan view of the transducer supporting apparatus of FIG. 9.
Figure 10B:
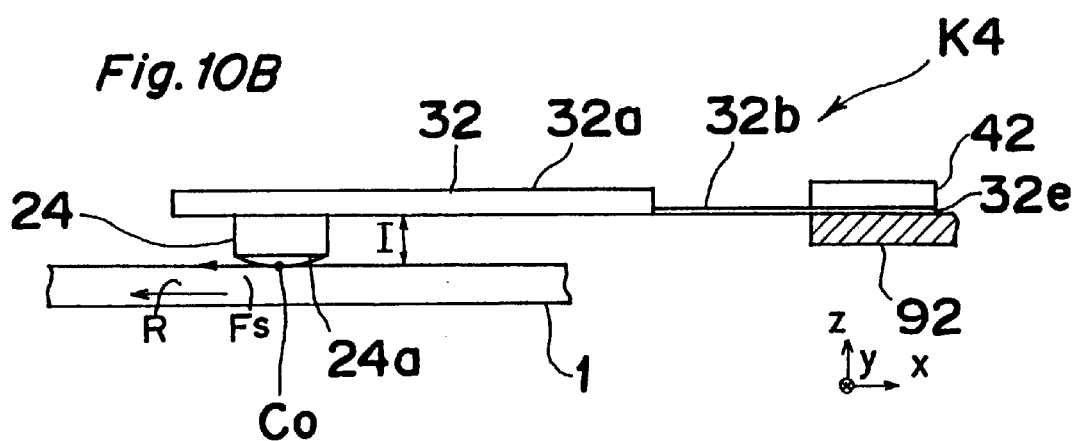
FIG. 10B is a side elevational view of the transducer supporting apparatus of FIG. 9.

In FIGS. 9, 10A, 10B, 11A and 11B, the magnetooptical disk 1, the magnetic core 11 and the coil 12 are the same as those of the transducer supporting apparatus K1. In FIG. 9, a slider 24 is made of resinous material in the same manner as the slider 23 of the transducer supporting apparatus K3. Substantially in the same manner as the transducer supporting apparatus K3, a cylindrical surface 24a acting as a projection having a generating line extending in a direction parallel to the y-axis is formed on one face of the slider 24 oriented in the minus direction of the z-axis. The contact line $C_0$, the magnetic core 11 and the coil 12 are provided on the slider 24 in the same manner as the slider 23 of the transducer supporting apparatus K3.

In FIG. 9, a load beam 32 acts not only as a loading means for depressing the slider 24 against the magnetooptical disk 1 but as a pivot means for causing the slider 24 to follow the tilt, etc. of the magnetooptical disk 1. The load beam 32 is made of stainless steel in the same manner as the load beam 31 of the transducer supporting apparatus K1. The load beam 32 is constituted by a rigid portion 32a having large rigidity about the y-axis to bending, a load generating portion 32b and a flat platelike fixing portion 32e extending continuously from the load generating portion 32b. The load generating portion 32b is formed by subjecting a flat platelike member to substantially cylindrical plastic deformation about the y-axis. The fixing portion 32e to which a fixing plate 42 is attached is provided for securing the transducer supporting apparatus K3 to a fixing base 92. The fixing plate 42, the load generating portion 32b, the rigid portion 32a and the slider 24 are coupled with each other sequentially in this order. A direction oriented from the fixing plate 42 towards the slider 24 coincides with the direction R of movement of the magnetooptical disk 1.

As shown in FIG. 10A, character M is defined as a centerline of the load beam 32. A plane containing the centerline M and extending perpendicularly to the magnetooptical disk 1 is defined here as a neutral plane. A rectangular opening 32d substantially symmetric at with respect to the neutral plane is formed on the load generating portion 32b and thus, a pair of the remaining portions of the load generating portion 32b are used as a pair of leaf springs 32c, respectively. These leaf springs 32c are symmetrical with respect to the neutral plane and extend in the direction R of movement of the magnetooptical disk 1. The leaf springs 32c are arranged to be actuated substantially independently of each other. When the leaf springs 32c are actuated in identical phase, the leaf springs 32c impart to the slider 24 a degree of freedom of translation in a direction parallel to the z-axis. On the contrary, when the leaf springs 32c are actuated in reverse phases, the leaf springs 32c impart to the slider 24 a degree of freedom of pivoting about an axis parallel to the x-axis such that its pivot center is disposed substantially at the centerline M.

Therefore, in this embodiment, since the load generating portion 32b imparts to the slider 24 a force for depressing the slider 24 against the magnetooptical disk 1 and a degree of freedom of pivoting, the means acting not only as the loading means but as the pivotal means is constituted by the rigid portion 32a, the load generating portion 32b and the fixing portion 32e. Since the width of the leaf springs 32c is not less than two times larger than that of the gimbals 31c of the transducer supporting apparatus K1, the permissible error of the leaf springs 32c increases and thus, the leaf springs 32c can be manufactured by blanking.

The metallic fixing plate 42 for increasing rigidity of the fixing portion 32e at the time the fixing portion 32e is attached to the fixing base 92 is secured to the fixing portion 32e by spot welding, etc. Two screw holes 32f are formed on the fixing portion 32e and are continuously communicated with two screw holes 42a on the fixing plate 42, respectively.

As shown in FIG. 10A, at one end of the load beam 32 in the minus direction of the x-axis, the slider 24 is attached to the load beam 32 by techniques such as ultrasonic fusion bonding such that the contact line $C_0$ of the slider 24 not only extends perpendicularly to the centerline M of the load beam 32 but is bisected by the centerline M. Therefore, a central pivot axis of the leaf springs 32c extends perpendicularly to the contact line $C_0$ and passes through a center of the contact line $C_0$ in the direction of the y-axis.

In case the transducer supporting apparatus K3 is applied to the magnetooptical disk 1 as in this embodiment, the fixing base 92 is generally a structure extending continuously from an optical head (not shown). The fixing base 92 is accessible in the radial direction of the magnetooptical disk 1, i.e., in the direction of the arrow B in FIG. 10A by a known seeking mechanism (not shown).

Next, operation of the transducer supporting apparatus K4 of the above described arrangement is described. In this embodiment, the centerline M of the load beam 32 is set at a main axis of the transducer supporting apparatus K4 such that the main axis of the transducer supporting apparatus K4 extends in a tangential direction of the magnetooptical disk 1. As a result, the contact line $C_0$ is parallel to the radial direction of the magnetooptical disk 1 and thus, extends perpendicularly to the direction R of movement of the magnetooptical disk 1.

When the transducer supporting apparatus K4 has been mounted on the fixing base 92 by using screws (not shown) or the like at the fixing portion 32e as shown in FIG. 10B, the cylindrical surface 24a of the slider 24 is brought into contact with the magnetooptical disk 1, so that the load generating portion 32b is elastically deformed to a substantially flat shape by force applied from the magnetooptical disk 1 to the slider 24 and thus, the rigid portion 32a becomes substantially parallel to the magnetooptical disk 1. As a result, the slider 24 is depressed against the magnetooptical disk 1 through the rigid portion 32a by elastic restoring force of the load generating portion 32b.

Initially, in case the magnetooptical disk 1 has neither displacement nor tilt due to defective flatness, etc., the cylindrical surface 24 is brought into contact with the magnetooptical disk 1 at the contact region in the vicinity of the contact line $C_0$ as shown in FIG. 10A. When the magnetooptical disk 1 is rotated about the z-axis in the direction of the arrow R by a spindle motor (not shown), the cylindrical surface 24a is brought into sliding contact with the magnetooptical disk 1. Since the fixing base 92 can be set in the direction of the arrow B of FIG. 10A, the slider 24 can be set to a desired location on the magnetooptical disk 1.

Due to friction between the slider 24 and the magnetooptical disk 1 in FIG. 10B, the sliding frictional force Fs is applied to the slider 24 in the minus direction of the x-axis, so that a moment about the y-axis similar to that of the transducer supporting apparatus K1 is applied to the rigid portion 32a. Supposing that character H denotes a distance I between the magnetooptical disk 1 and the rigid portion 32a, this moment is expressed by Fs×I. However, the rigid portion 32a is allowed to be pivoted only about the x-axis by action of the leaf springs 32c but has quite large rigidity against the above mentioned moment about the y-axis and therefore, is not pivoted about the y-axis. Accordingly, since the attitude of the slider 24 is kept stable against the sliding frictional force Fs, undesirable pitching motions of the prior art do not occur in the slider 24.

Meanwhile, since a direction oriented from the fixing portion 32e towards the slider 24 is made coincident with the direction R of movement of the magnetooptical disk 1, the sliding frictional force Fs is applied so as to pull the load generating portion 32b at all times and therefore, is not applied to the load generating portion 32b transversely to the main axis or in a buckling direction. Hence, the slider 24 is held in quite stable sliding contact with the magnetooptical disk 1 without abnormal vibrations of the transducer supporting apparatus K4. If the coil 12 is turned on in this state, a magnetic field for recording or erasure is imparted to the magnetooptical disk 1 through the magnetic core 11. Since recording per se on the magnetooptical disk 1 is well known, its description is abbreviated for the sake of brevity.

Figure 11A:
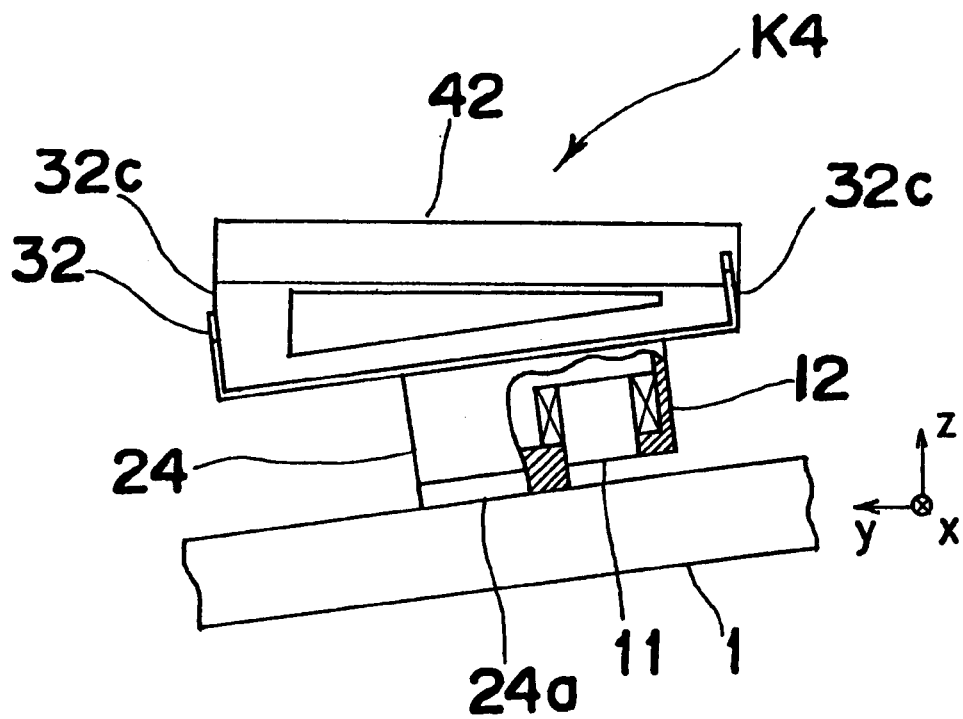
FIG. 11A is a view indicative of operation of the transducer supporting apparatus of FIG. 9.

Next, operation of the transducer supporting apparatus K4 in the case where the magnetooptical disk 1 is tilted due to its defective flatness, etc. is described. In FIG. 11A, the transducer supporting apparatus K4 is viewed in the plus direction of the x-axis. FIG. 11A shows a case in which the magnetooptical disk 1 is tilted about the x-axis, i.e., an axis not parallel to the contact line $C_0$. The slider 24 is depressed against the magnetooptical disk 1 by the elastic restoring force of the load generating portion 32b and can be pivoted about the x-axis by action of the leaf springs 32c. Namely, the leaf springs 32c deflect the slider 24 independently of each other so as to pivot the slider 24 about the x-axis. Therefore, the slider 24 is pivoted in accordance with the tilt of the magnetooptical disk 1 while the cylindrical surface 24a and the magnetooptical disk 1 are being held in contact with each other, so that the cylindrical surface 24a is held in stable sliding contact with the magnetooptical disk 1. As a result, the magnetic core 11 follows the magnetooptical disk 1 completely and thus, excellent efficiency of the transducer supporting apparatus K4 is maintained.

Figure 11B:
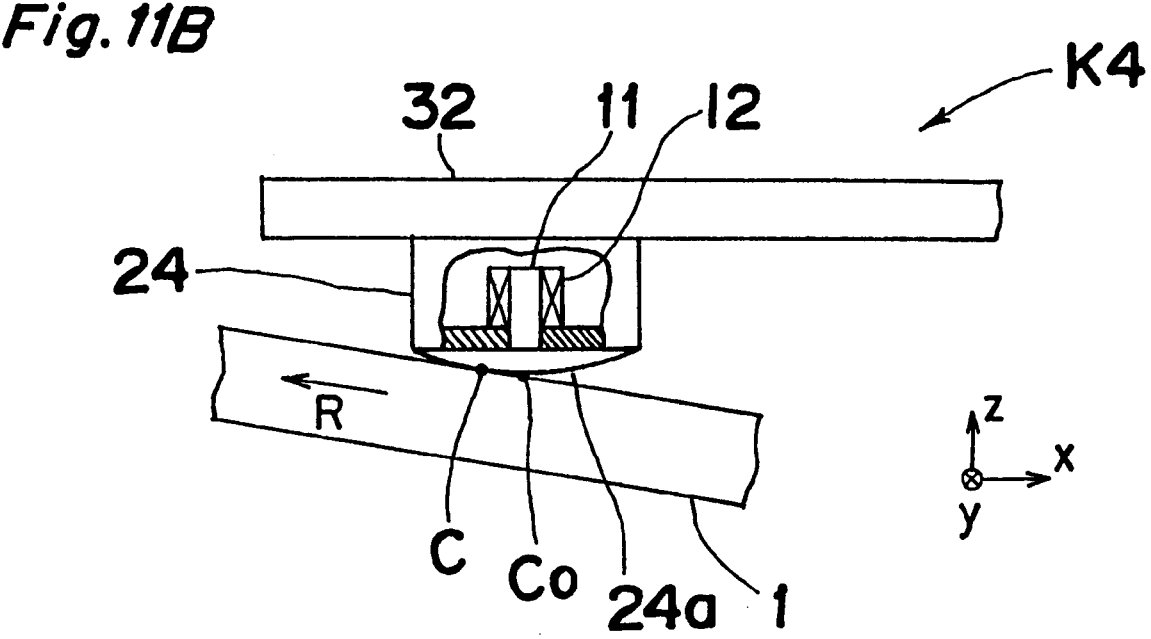
FIG. 11B is another view indicative of operation of the transducer supporting apparatus of FIG. 9.

In FIG. 11B, the transducer supporting apparatus K4 is viewed in the plus direction of the y-axis. FIG. 11B shows a case in which the magnetooptical disk 1 is tilted about the y-axis, i.e., an axis parallel to the contact line $C_0$. Since the slider 24 does not have a degree of freedom of pivoting about the y-axis, the slider 24 is not capable of following the tilt of the magnetooptical disk 1 about the y-axis. However, since the cylindrical surface 24a having the generating line parallel to y-axis is provided, the cylindrical surface 24 is brought into contact with the magnetooptical disk 1 along the contact line C different from the contact line $C_0$. Accordingly, the cylindrical surface 24 is held in stable sliding contact with the magnetooptical disk 1.

At this time, the magnetic core 11 is disposed such that the center of the image of the magnetic core 11 projected on the magnetooptical disk 1 passes through the contact line $C_0$ in the same manner as the transducer supporting apparatuses K2 and K3. Thus, even if the actual contact line is shifted to the arbitrary contact line C, variations of distance between the magnetic core 11 and the magnetooptical disk 1 are minimized.

Meanwhile, in this embodiment, a pair of the leaf springs 32c formed at a portion of the load generating portion are employed as load generating elements for effecting pivotal movement but may be replaced by wires if design conditions permit. It is needless to say that two or more pairs of leaf springs may be used as the load generating elememnts.

Furthermore, in order to form the loading means and the pivot means integrally in this embodiment, a method is employed in which the rectangular opening 32d is provided at the load generating portion 32b so as to form the leaf springs 32c but may also be replaced by another method. For example, such a method may be employed in which the distance between the leaf springs 32c is reduced so as to lessen resistance against pivoting of the slider 24. In a further method, a single plate member is concentrated at the main axis such that the slider 24 is pivoted only through torsion.

Figure 12:
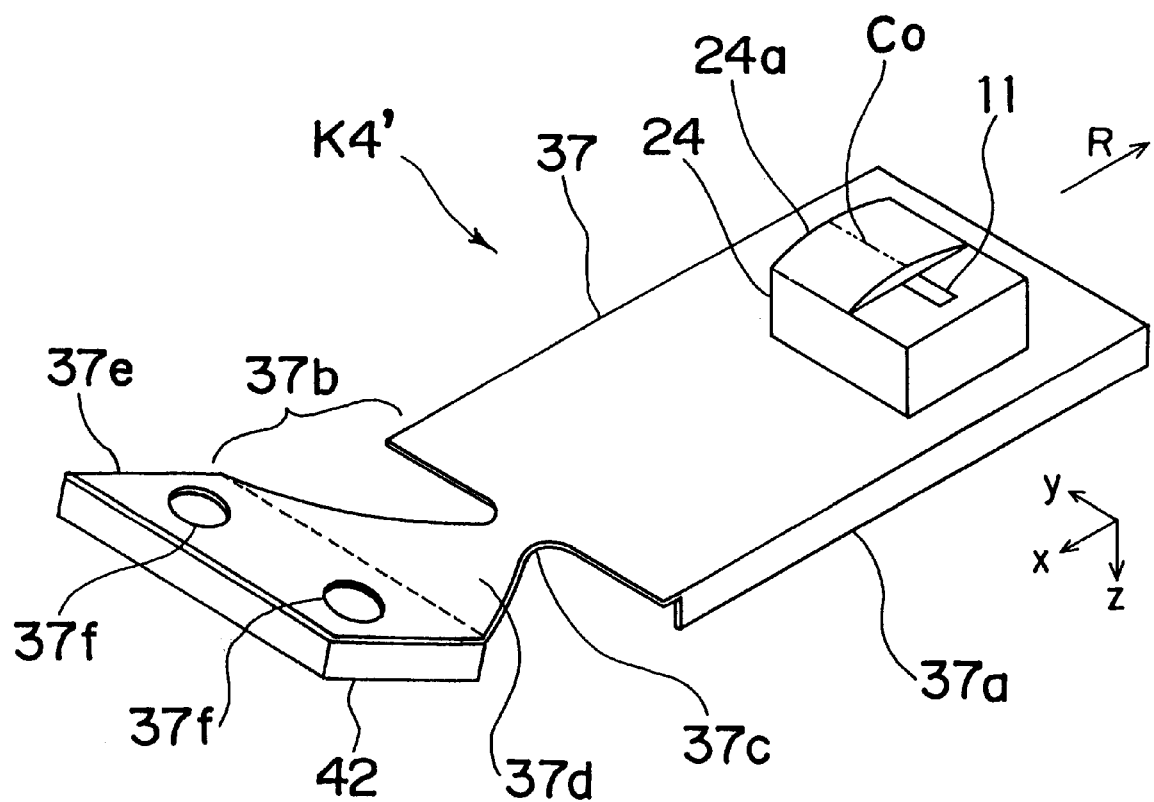
FIG. 12 is a perspective view showing a modification of the transducer supporting apparatus of FIG. 9.

FIG. 12 shows a modification K4' of the transducer supporting apparatus K4, in which the load beam 37 acts not only as the loading means but as the pivot means. A load generating portion 37b of the load beam 37 has a triangular plate portion 37d and a waist portion 37c having a small cross-sectional area in the vicinity of one of the vertexes of the triangular plate portion 37d. Other ;portions of the load beam 37 are the same as those of the load beam 32 of the transducer supporting apparatus K4. Since other constructions of the transducer supporting apparatus K4' are similar to those of the transducer supporting apparatus K4, the description is abbreviated for the sake of brevity.

Since the waist portion 37c is readily pivoted about the x-axis, the waist portion 37c imparts to the slider 24 a degree of pivoting about the x-axis. Meanwhile, through elastic deformation of the triangular plate portion 37d, the triangular plate portion 37d imparts to the slider 24 a force for depressing the slider 24 against the magnetooptical disk 1. Therefore, the means acting not only as the loading means but as the pivot means is constituted by a rigid portion 37a, the load generating portion 37b and a fixing portion 37e. Since cross-sectional area of the triangular plate portion 37d is gradually increased in a direction towards the fixing portion 37e, stress applied to the triangular plate portion 37d at the time the slider 24 is brought into contact with the magnetooptical disk 1 is dispersed.

As described above in this embodiment, the cylindrical surface 24a projects further towards the magnetooptical disk 1 than the magnetic core 11, the contact line $C_0$ between the cylindrical surface 24a and the magnetooptical disk 1 extends perpendicularly to the direction R of movement of the magnetooptical disk 1 and the means acting not only as the loading means but as the pivot means is constituted by the rigid portion 37a, the load generating portion 37b and the fixing portion 37e. Furthermore, the pivot axis intersects with the contact line $C_0$ orthogonally, the magnetic core 11 is disposed adjacent to the contact line $C_0$ and the magnetic core 11 is disposed more adjacent to the outer periphery of the magnetooptical disk 1 than the contact line $C_0$. Consequently, in addition to the effect of the transducer supporting apparatus K1 that sliding contact of the slider 24 with the magnetooptical disk 1 is stabilized, the effect of the transducer supporting apparatus K2 that efficiency of magnetic field imparted to the magnetooptical field 1 is improved and the effect of the transducer supporting apparatus K3 that travel of the slider 24 at the outermost periphery of the magnetooptical disk 1 is stabilized, the complicated constructions such as the gimbals 31c of the transducer supporting apparatuses K1 to K3 are not required to be provided in the transducer supporting apparatus K4 and thus, the load beam 32 including the pivot means can be manufactured by pressing, thereby resulting in sharp reduction of production costs of the transducer supporting apparatus K4.

Meanwhile, since the direction oriented from the fixing portion 37e towards the slider 24 is made coincident with the direction R of movement of the magnetooptical disk 1, resonance of the transducer supporting apparatus K4 due to buckling of the load generating portion 37b and load applied to the load generating portion 37b transversely to the main axis.

Figure 13:
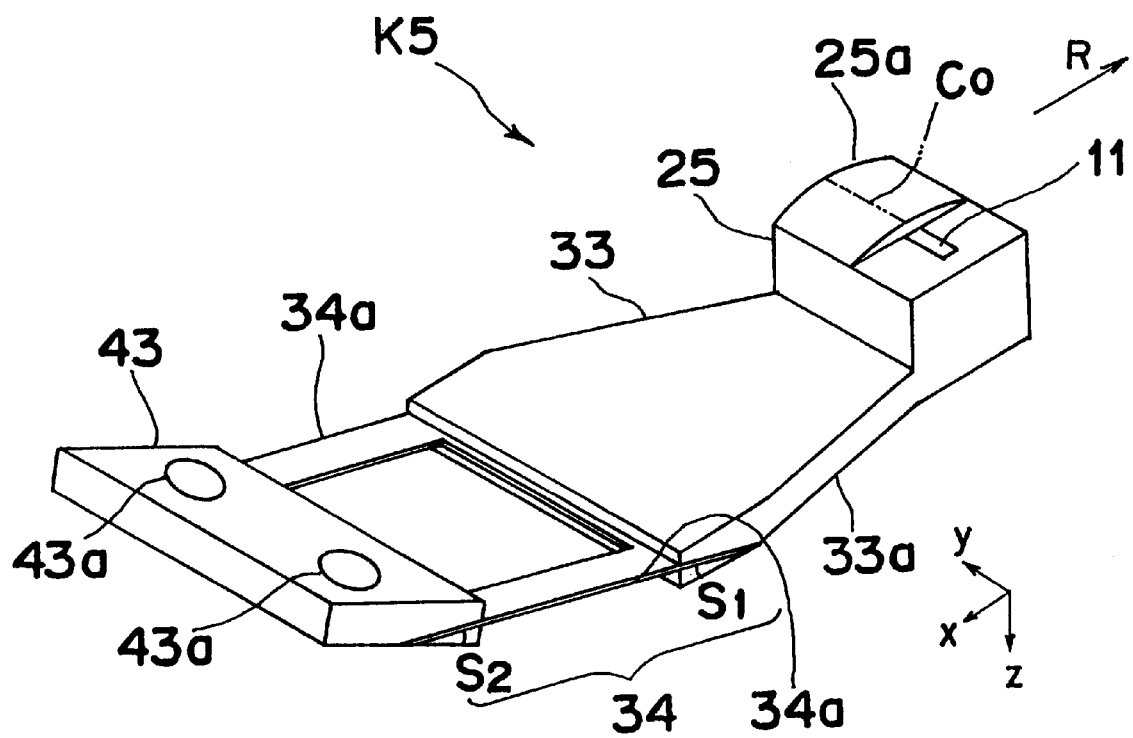
FIG. 13 is a perspective view of a transducer supporting apparatus according to a fifth embodiment of the present invention.
Figure 14:
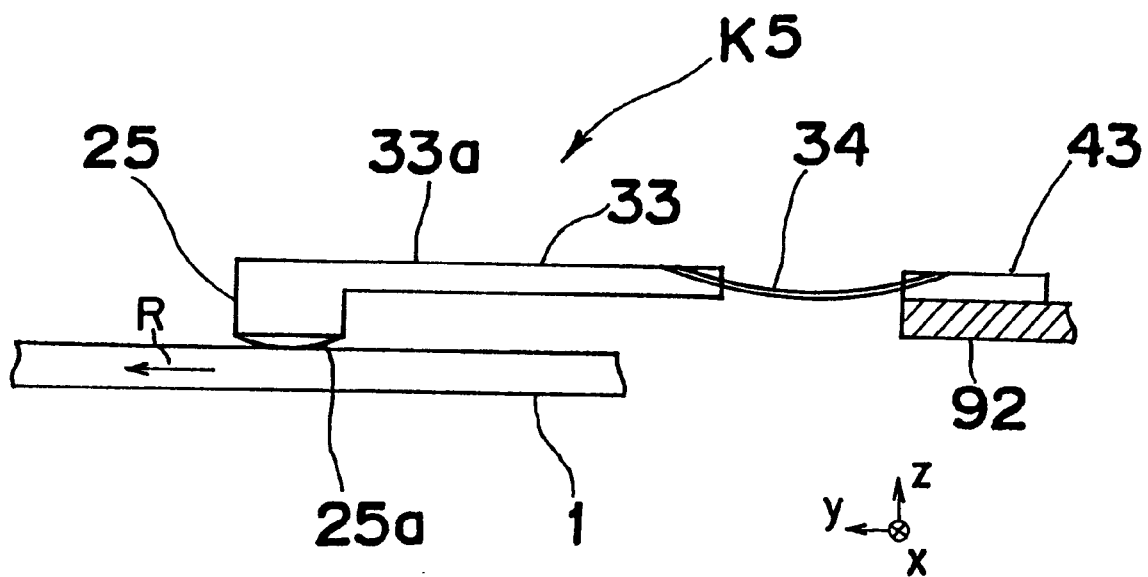
FIG. 14 is a side elevational view of the transducer supporting apparatus of FIG. 13.

Hereinafter, a transducer supporting apparatus K5 according to a fifth embodiment of the present invention is described with reference to FIGS. 13 and 14. In the same manner as the transducer supporting apparatus K1, a magnetic head suitable for a sliding contact type magnetooptical disk is employed as a transducer also in this embodiment. A right-hand orthogonal system of coordinates is defined as shown in these figures. In FIG. 14, the transducer supporting apparatus K5 is viewed in the plus direction of the y-axis.

In FIG. 14, the magnetooptical disk 1 and the fixing base 92 are the same as those of the transducer supporting apparatus K4. A cylindrical surface 25a of a slider 25 has a shape entirely identical with that of the cylindrical surface 24a of the slider 24 of the transducer supporting apparatus K4. Layout of the cylindrical surface 25a, the magnetic core 11 and the incorporated coil 12 (not shown) and definition of the contact line $C_0$, etc. are the same as those of the transducer supporting apparatus K4.

However, in this embodiment, a rigid portion 33a of a load beam 33 is made of resin and a slider 25 made of resin is formed integrally with the rigid portion 33a. The resin preferably includes liquid crystal polymer, nylon, etc. A platelike fixing portion 43 is made of resin and is formed with two screw holes 43a for mounting the fixing portion 43 on the fixing base 92. From a standpoint of mass-production efficiency, it is preferable that the fixing portion 43 should be made of resin identical with that of the rigid portion 33a.

A flat plate 34 acting in the same manner as the load generating portion 31b of the transducer supporting apparatus K1 is not subjected to plastic bending performed in the transducer supporting apparatuses K1 to K4. By forming a rectangular opening in the flat plate 34 in the same manner as the load generating portion 32b of the transducer supporting apparatus K4, a pair of leaf springs 34a are formed on the flat plate 34. The flat plate 34 is made of stainless steel or the like in the same manner as the load beams 31 and 32 of the transducer supporting apparatuses K1 to K4. Since the flat plate 34 is simple in shape, the flat plate 34 can be manufactured by pressing in the same manner as the load beam 32 of the transducer supporting apparatus K4.

The rigid portion 33a and the fixing portion 43 are coupled with each other by insert molding of the flat plate 34. At the time of insert molding of the flat plate 34, a predetermined angle $S_1$ about the y-axis is formed between the rigid portion 33a and the flat plate 34 and a predetermined angle $S_2$ about the y-axis is formed between the fixing portion 43 and the flat plate 34.

In the same manner as the transducer supporting apparatus K4, the means acting not only as the loading means but as the pivot means is constituted by the rigid portion 33a, the flat plate 34 and the fixing portion 43. Also in this embodiment, the contact line $C_0$ extends perpendicularly to the direction R of movement of the magnetooptical disk 1.

Next, operation of the transducer supporting apparatus K5 of the above described arrangement is described. When the fixing portion 43 is mounted on the fixing base 92, the cylindrical surface 25a is brought into contact with the magnetooptical disk 1, so that the rigid portion 33a deforms the a flat plate 34 from flat shape to a cylindrical shape and thus, the cylindrical surface 25a is depressed against the magnetooptical disk 1 by elastic a restoring force of the flat plate 34. Therefore, the flat plate 34 is operated in entirely the same manner as the load generating portion 32b of the transducer supporting apparatus K4. Since the slider 25 follows the tilt of the magnetooptical disk 1 in the same manner as the transducer supporting apparatus K4, the description is abbreviated for the sake of brevity.

Meanwhile, the method of this embodiment in which the rigid portion 33a, the flat plate 34 and the fixing portion 43 act not only as the loading means but as the pivot means may also be replaced by that of the transducer supporting apparatus K4.

In the same manner as the first to fourth embodiments, the cylindrical surface 25a projects further towards the magnetooptical disk 1 than the magnetic core 11, the contact line $C_0$ between the cylindrical surface 25a and the magnetooptical disk 1 extends perpendicularly to the direction R of movement of the magnetooptical disk 1, the means acting not only as the loading means but as the pivot means is constituted by the rigid portion 33a, the flat plate 34 and the fixing portion 43, the pivot axis intersects with the contact line $C_0$ orthogonally, the magnetic core 11 is disposed adjacent to the contact line $C_0$, the magnetic core 11 is disposed more adjacent to the outer periphery of the magnetooptical disk 1 than the contact line $C_0$ and the direction oriented from the fixing portion 43 towards the slider 25 is made coincident with the direction R of movement of the magnetooptical disk 1 in this embodiment. Consequently, the effect of the transducer supporting apparatus K1 that sliding contact of the slider 21 with the magnetooptical disk 1 is stabilized, the effect of the transducer supporting apparatus K2 that efficiency of magnetic field is improved, the effect of the transducer supporting apparatus K3 that the slider 23 stably travels at the outermost periphery of the magnetooptical disk 1 and the effects of the transducer supporting apparatus K4 that production of the load beam 32 by pressing lowers its production cost and resonance of the transducer supporting apparatus K4 is prevented can be gained in this embodiment.

In addition to the above described effects of the transducer supporting apparatuses K1 to K4, since the rigid portion 33a is molded by resin, bending of the rigid portion 31a in the first to fourth embodiments is not required to be performed in this embodiment.

Meanwhile, since the rigid portion 33a is molded integrally with the slider 25, the process for bonding the slider to the load beam, which is required to be performed in the first to fourth embodiments, can be eliminated.

Furthermore, when the fixing portion 43 is molded by resin and the flat plate 34 is formed by insert molding, the process for spot welding the fixing plate to the fixing portion, which is required to be performed in the first to fourth embodiments, can be eliminated.

Moreover, since the load generating portion employed in the first to fourth embodiments is replaced by the flat plate 34 and the flat plate 34 is subjected to insert molding so as to form the predetermined angles with the rigid portion 33a and the fixing portion 43, respectively, plastic bending for forming the load generating portion of the first to fourth embodiments is eliminated, thereby resulting in great reduction of production costs of the transducer supporting apparatus K5.

Hereinafter, a transducer supporting apparatus K6 according to a sixth embodiment of the present invention is described with reference to FIGS. 15 to 16B. In the same manner as the transducer supporting apparatus K1, a magnetic head suitable for a sliding contact type magnetooptical disk is employed as a transducer also in this embodiment. A right-hand orthogonal system of coordinates is defined as shown in these figures. The transducer supporting apparatus K6 is viewed in the plus direction of the x-axis in FIG. 16A, while the transducer supporting apparatus K6 is viewed in the plus direction of the y-axis in FIG. 16B.

The transducer supporting apparatus K6 as a whole is structurally similar to the transducer supporting apparatus K5. The magnetooptical disk 1, the magnetic core 11, the fixing portion 43 and the flat plate 34 of the transducer supporting apparatus K6 are the same as those of the transducer supporting apparatus K5. The fixing portion 43 is mounted on the fixing base 92 of FIG. 10B.

Figure 15:
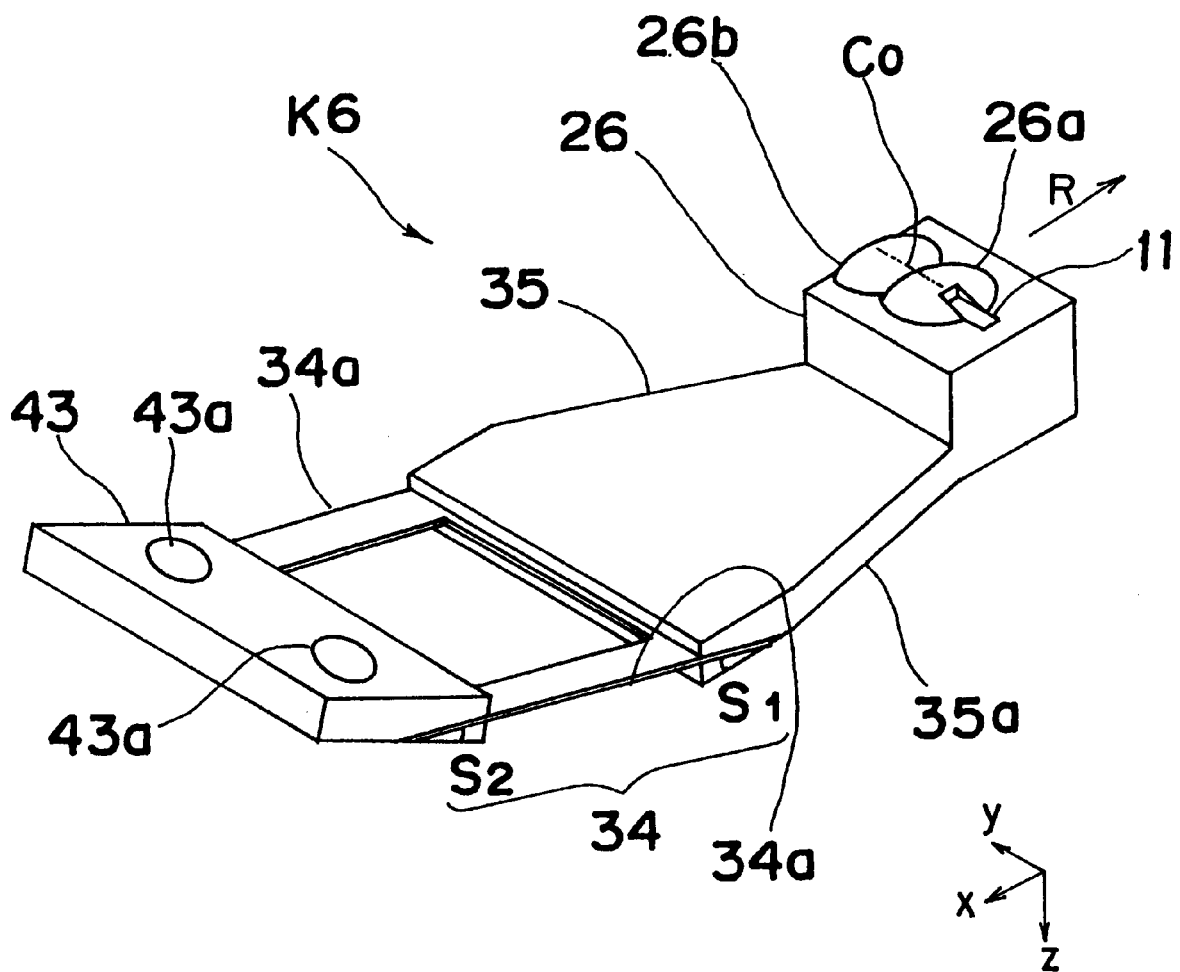
FIG. 15 is a perspective view of a transducer supporting apparatus according to a sixth embodiment of the present invention.

In FIG. 15, a rigid portion 35a of a load beam 35 has a shape identical with that of the rigid portion 33a of the transducer supporting apparatus K5 and only a slider 26 is different from the slider 25 of the transducer supporting apparatus K5. In the same manner as the transducer supporting apparatus K5, the slider 26 is formed integrally with the rigid portion 35a. Two spherical surfaces 26a and 26b having centers spaced in a direction parallel to the y-axis project from one face of the slider 26 oriented in the minus direction of the z-axis.

When the spherical surfaces 26a and 26b are brought into contact with the magnetooptical disk 1, two minute circular contact regions arranged in a direction parallel to the y-axis are formed therebetween. A segment connecting centers of the circular contact regions is referred to as a contact line C and the contact line C is defined as a contact line $C_0$ as shown in FIG. 15 in case the magnetooptical disk 1 is free from defective flatness, etc.

It is preferable that the spherical surfaces 26a and 26b are disposed such that an interval between the two circular contact regions is maximized. For example, in FIG. 15, the interval between the two circular contact regions is increased under restrictions on shape imposed by the slider 26 and the magnetic core 11. As a result, the spherical surfaces 26a and 26b are partially deleted by an outer wall of the slider 26 and a hole for the magnetic core 11 but care should taken that vertex portions of the spherical surfaces 26a and 26b are formed without fail.

Layout of the magnetic core 11 and the coil 12 relative to the contact line $C_0$ is identical with that of the transducer supporting apparatuses K3 to K5. In the same manner as the first to fifth embodiments, the contact line $C_0$ intersects with the direction R of movement of the magnetooptical disk 1 orthogonally.

In the same manner as the transducer supporting apparatus K5, the flat plate 34 is subjected to insert molding so as to form the predetermined angles $S_1$ and $S_2$ with the rigid portion 35a and the fixing portion 43, respectively. The means acting not only as the loading means but as the pivot means is constituted by the rigid portion 35a, the flat plate 34 and the fixing portion 43.

Next, operation of the transducer supporting apparatus K6 of the above described arrangement is described. In the same manner as the transducer supporting apparatus K5, the transducer supporting apparatus K6 is disposed such that a main axis of the transducer supporting apparatus K6 extends in the tangential direction of the magnetooptical disk 1. As a result, the contact line $C_0$ extends in parallel with the radial direction of the magnetooptical disk 1. Since operation of the transducer supporting apparatus K6 is substantially the same as that of the transducer supporting apparatus K5, points different from those of the transducer supporting apparatus K5 are mainly described.

Figure 16A:
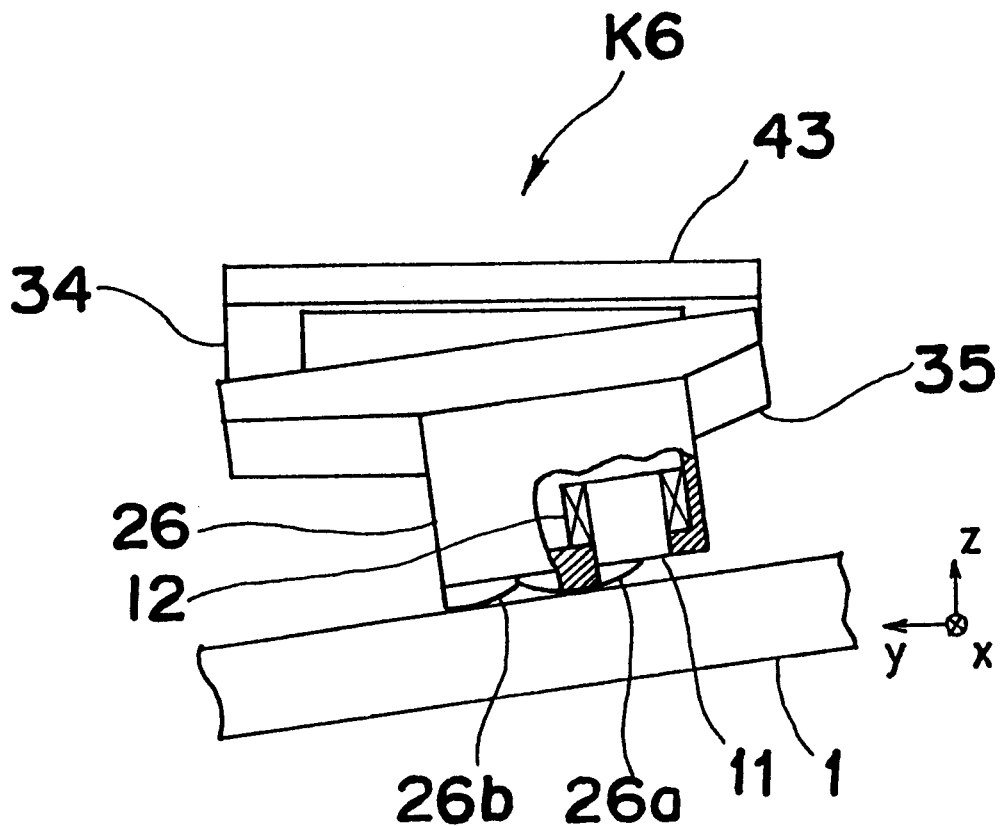
FIG. 16A is a view indicative of operation of the transducer supporting apparatus of FIG. 15.

FIG. 16A shows a case in which the magnetooptical disk 1 is tilted about the x-axis, i.e., an axis not parallel to the contact line $C_0$. The slider 26 is depressed against the magnetooptical disk 1 by an elastic restoring force of the flat plate 34 and the slider 26 can be pivoted about the x-axis by action of the leaf springs 34a. Namely, the leaf springs 34a deflect the slider 26 independently of each other so as to pivot the slider 26 about the x-axis. Therefore, the slider 26 is pivoted such that the two spherical surfaces 26a and 26b are brought into contact with the magnetooptical disk 1 as shown in FIG. 16A.

Accordingly, the slider 26 is pivoted in accordance with the tilt of the magnetooptical disk 1 while the slider 26 is being held in contact with the magnetooptical disk 1, so that the slider 26 is held in stable sliding contact with the magnetooptical disk 1. As a result, the magnetic core 11 follows the magnetooptical disk 1 completely and thus, excellent efficiency of the transducer supporting apparatus K6 is maintained.

Figure 16B:
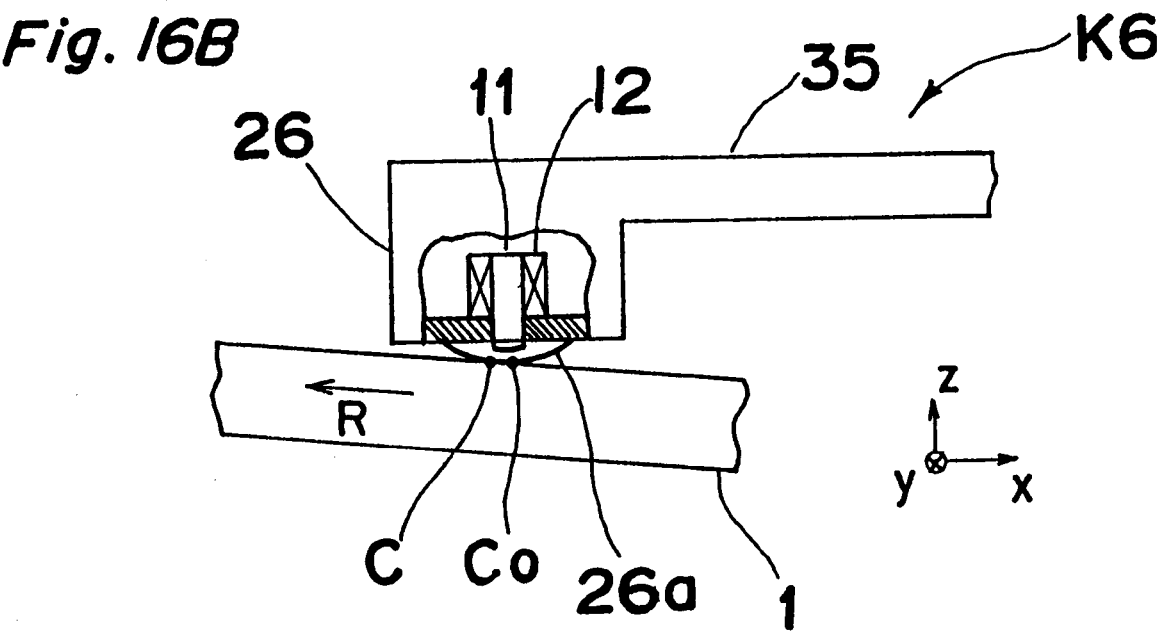
FIG. 16B is another view indicative of operation of the transducer supporting apparatus of FIG. 15.

FIG. 16B shows a case in which the magnetooptical disk 1 is tilted about the y-axis, i.e., an axis parallel to the contact line $C_0$. Since the slider 26 does not have a degree of freedom of pivoting about the y-axis, the slider 26 does not follow the tilt of the magnetooptical disk 1. However, since the spherical surfaces 26a and 26b having the centers spaced in parallel with the y-axis are formed, and the spherical surfaces 26a and 26b are brought into contact with the magnetooptical disk 1 along the contact line C different from the contact line $C_0$, the slider 26 is held in stable sliding contact with the magnetooptical disk 1.

At this time, the magnetic core 11 is disposed such that the center of the image of the magnetic core 11 projected on the magnetooptical disk 1 passes through the contact line $C_0$ in the same manner as the second to fifth embodiments. Therefore, even if the actual contact line is shifted to the arbitrary contact line C, variations of distance between the magnetic core 11 and the magnetooptical disk 1 are minimized.

Since the spherical surfaces 26a and 26b are projected from the slider 26, the contact regions viewed in the direction opposite to the direction R of movement of the magnetooptical disk 1 exhibit two spotlike contact portions as shown in FIG. 16A and thus, the area of the contact portions is reduced greatly in comparison with those of the first to fifth embodiments employing the cylindrical surface projecting from the slider.

Therefore, even in case foreign matter such as dust is present on the magnetooptical disk 1, the probability that the dust will adhere to the slider 26 is sharply reduced. Furthermore, since the spherical surfaces 26a and 26b are projected from the slider 26, the spherical surfaces 26a and 26b are convex curved surfaces and therefore, do not include concave portions. Accordingly, the spherical surfaces 26a and 26b do not have portions for storing dust. As a result, the excellent sliding property of the slider 26 present at an initial stage can be maintained for a long period.

Furthermore, since an interval between the spherical surfaces 26a and 26b is maximized, the interval between the contact regions is increased. Thus, in case the magnetooptical disk 1 is tilted about the x-axis, i.e., an axis not parallel to the contact line $C_0$, the magnitude of the moment applied to the slider 26 in a rolling direction of the flat plate 34 becomes sufficiently large, so that sensitivity of the slider 26 to tilt of the magnetooptical disk 1 reaches its maximum and thus, the slider 26 is capable of following the magnetooptical disk 1 excellently.

Meanwhile, in this embodiment, the two spherical surfaces 26a and 26b are recited as one example in which a minimum contact line of the projections is obtained but three or more spherical surfaces may also be provided along the contact line. In this case, durability of the slider 26 will be improved due to distribution of contact stress.

As described above in this embodiment, the two spherical surfaces 26a and 26b project further towards the magnetooptical disk 1 than the magnetic core 11, the contact line $C_0$ between the cylindrical surfaces 26 and 26b and the magnetooptical disk 1 extends perpendicularly to the direction R of movement of the magnetooptical disk 1, the means acting not only as the loading means but as the pivot means is constituted by the rigid portion 35a, the flat plate 34 and the fixing portion 43 and the pivot axis of the pivot means intersects with the contact line $C_0$ orthogonally.

Furthermore, the magnetic core 11 is disposed adjacent to the contact line $C_0$, the magnetic core 11 is disposed more adjacent to the outer periphery of the magnetooptical disk 1 than the contact line $C_0$, the direction oriented from the fixing portion 43 towards the slider 26 is made coincident with the direction R of movement of the magnetooptical disk 1, the rigid portion 35a and the slider 26 are formed integrally with each other by resin and the rigid portion 35a and the fixing portion 43 are coupled with each other by insert molding of the flat plate 34.

Consequently, the effect of the transducer supporting apparatus K1 that sliding contact of the slider 26 with the magnetooptical disk 1 is stabilized, the effect of the transducer supporting apparatus K2 that efficiency of magnetic field is improved, the effect of the transducer supporting apparatus K3 that the slider 23 stably travels at the outermost periphery of the magnetooptical disk 1, the effects of the transducer supporting apparatus K4 that production of the load beam 32 by pressing lowers its production cost and resonance of the transducer supporting apparatus K4 is prevented and the effect of the transducer supporting apparatus K5 that production cost of the load beam 33 is lowered by reducing the number of the production processes through insert molding of the flat plate 34 can be achieved in this embodiment.

In addition to the above mentioned effects of the transducer supporting apparatuses K1 to K5, such remarkable effects can be gained that deposition of dust on the slider 26 is minimized through reduction of the contact regions and excellent sliding property of the slider 26 at an initial stage can be maintained for a long period.

Finally, a transducer supporting apparatus K7 according to a seventh embodiment of the present invention is described with reference to FIG. 17. In the same manner as the transducer supporting apparatus K1, a magnetic head suitable for a sliding contact type magnetooptical disk is employed as a transducer also in this embodiment. A right-hand orthogonal system of coordinates is defined as shown in FIG. 17.

Except for the shape of a projection on a slider 27, the transducer supporting apparatus K7 as a whole is structurally similar to the transducer supporting apparatus K6. In FIG. 17, the magnetic core 11, the fixing portion 43 and the flat plate 34 are the same as those of the transducer supporting apparatus K6. Meanwhile, the transducer supporting apparatus K7 is arranged to be used for the magnetooptical disk 1 of the transducer supporting apparatus K6. The fixing portion 43 is mounted on the fixing base 92 of FIG. 10B.

Figure 17:
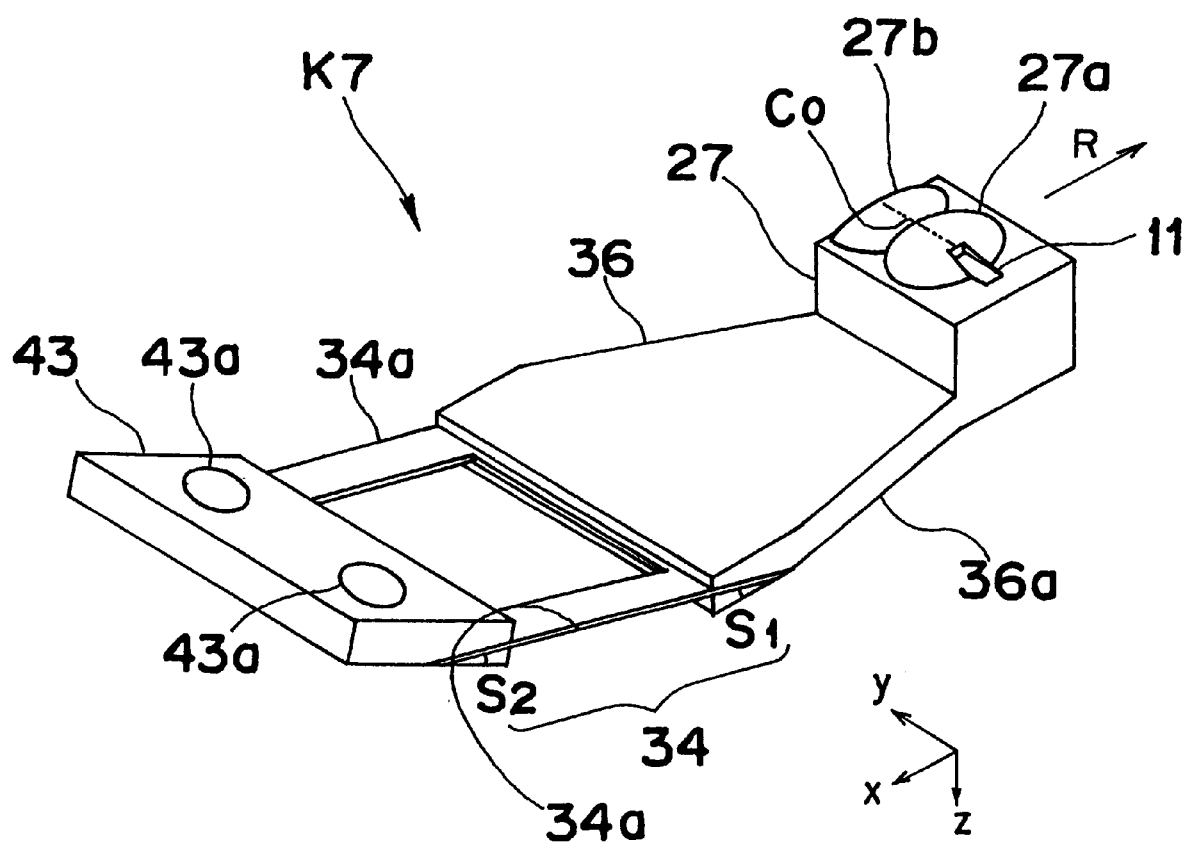
FIG. 17 is a perspective view of a transducer supporting apparatus according to a seventh embodiment of the present invention.

In FIG. 17, a rigid portion 36a of a load beam 36 is identical, also in its material, with that of the transducer supporting apparatus K6. In the same manner as the transducer supporting apparatus K6, the slider 27 is formed integrally with the rigid portion 36a. Two elliptic surfaces 27a and 27b having centers spaced in a direction parallel to the y-axis project from one face of the slider 27 oriented in the minus direction of the z-axis. In the transducer supporting apparatus K7, a major axis and a minor axis of each of the elliptic surfaces 27a and 27b extend in directions of the x-axis and the y-axis, respectively, and a length of the minor axis of each of the elliptic surfaces 27a and 27b is set to be equal to a diameter of each of the spherical surfaces 26a and 26b of the transducer supporting apparatus K6.

When the elliptic surfaces 27a and 27b are brought into contact with the magnetooptical disk 1, two elliptical contact regions each having a major axis extending in the direction parallel with the x-axis are arranged side by side in the direction of the y-axis. A segment connecting centers of the elliptic contact regions is referred to as a contact line C and the contact line C is defined as a contact line $C_0$ as shown in FIG. 17 in case the magnetooptical disk 1 is free from defective flatness, etc.

Meanwhile, for the same reason as that of the sixth embodiment, an interval between the spherical surfaces 27a and 27b is maximized. In the same manner as the transducer supporting apparatus K6, the magnetic core 11 and the coil 12 (not shown) are mounted on the slider 27. In the transducer supporting apparatus K7, the magnetic core 11 and the coil 12 are disposed relative to the contact line $C_0$ in the same manner as the third to sixth embodiments. In the same manner as the first to sixth embodiments, the contact line $C_0$ is disposed so as to extend perpendicularly to the direction R of movement of the magnetooptical disk 1.

In the same manner as the sixth embodiment, the flat plate 34 is subjected to insert molding so as to form the predetermined angles $S_1$ and $S_2$ with the rigid portion 36a and the fixing portion 43, respectively. The means acting not only as the loading means but as the pivot means is constituted by the rigid portion 36a, the flat plate 34 and the fixing portion 43. In the same manner as the fifth embodiment, the transducer supporting apparatus K7 is disposed such that a main axis of the transducer supporting apparatus K7 extends in the tangential direction of the magnetooptical disk 1. As a result, the contact line $C_0$ becomes parallel to the radial direction of the magnetooptical disk 1.

Operation of the transducer supporting apparatus K7 is substantially the same as that of the transducer supporting apparatus K6 and thus, the description is abbreviated for the sake of brevity. However, since the area of the contact regions in the transducer supporting apparatus K7 is different from that of the transducer supporting apparatus K6, the sliding state of the slider 27 in the transducer supporting apparatus K7 is different from that of the slider 26 of the transducer supporting apparatus K6. Namely, in the transducer supporting apparatus K7, since the spherical surfaces 26a and 26b of the transducer supporting apparatus K6 are replaced by the elliptic surfaces 27a and 27b each having its major axis extending in the direction parallel to the x-axis, the area of the contact regions is larger than that of the transducer supporting apparatus K6. Therefore, contact pressure in the transducer supporting apparatus K7 can be reduced as compared with that of the transducer supporting apparatus K6. As a result, wear of the slider 27 can be lessened and thus, durability of the transducer supporting apparatus K7 is improved.

Furthermore, since the length of the minor axis of each of the elliptic surfaces 27a and 27b in the direction of the y-axis is set to be equal to the diameter of each of the spherical surfaces 26a and 26b of the transducer supporting apparatus K6, the width of the contact regions viewed in the direction of the x-axis, i.e., in the direction opposite to the direction R of movement of the magnetooptical disk 1 is substantially the same as that of the transducer supporting apparatus K6. Accordingly, in the transducer supporting apparatus K7, since the probability of deposition of dust does not rise, the excellent sliding property of the slider 27 at an initial stage can be maintained for a long period. Meanwhile, since contact pressure between the slider 27 and the magnetooptical disk 1 drops, service life of a sliding contact film of the magnetooptical disk 1 is also lengthened.

As described in this embodiment, the two elliptic surfaces 27a and 27b project further towards the magnetooptical disk 1 than the magnetic core 11, the contact line $C_0$ between the elliptic surfaces 27a and 27b and the magnetooptical disk 1 extends perpendicularly to the direction R of movement of the magnetooptical disk 1, the means acting not only as the loading means but as the pivot means is constituted by the rigid portion 36a, the flat plate 36 and the fixing portion 43 and the pivot axis of the pivot means intersects with the contact line $C_0$ orthogonally. Moreover, the magnetic core 11 is disposed adjacent to the contact line $C_0$, the magnetic core 11 is disposed more adjacent to the outer periphery of the magnetooptical disk 1 than the contact line $C_0$, the direction oriented from the fixing portion 43 towards the slider 27 is made coincident with the direction R of movement of the magnetooptical disk 1, the rigid portion 36a and the fixing portion 43 are formed integrally with each other by resin and the rigid portion 36a and the fixing portion 43 are coupled with each other by insert molding of the flat plate 34.

Consequently, the effect of the transducer supporting apparatus K1 that sliding contact of the slider 27 with the magnetooptical disk 1 is stabilized, the effect of the transducer supporting apparatus K2 that efficiency of magnetic field is improved, the effect of the transducer supporting apparatus K3 that the slider 23 stably travels at the outermost periphery of the magnetooptical disk 1, the effects of the transducer supporting apparatus K4 that production of the load beam 32 by pressing lowers its production cost and resonance of the transducer supporting apparatus K4 is prevented, the effect of the transducer supporting apparatus K5 that production cost of the load beam 33 is lowered by reducing the number of the production processes through insert molding of the flat plate 34 and the effect of the transducer supporting apparatus K6 that deposition of dust on the slider 26 is lessened can be achieved in this embodiment.

In addition to the above described effects of the transducer supporting apparatuses K1 to K6, such a great effect can be gained that wear of the slider 27 is lessened through reduction of the contact area between the slider 27 and the magnetooptical disk 1 and thus, durability of the transducer supporting apparatus K7 is improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

Industrial Applicability

Meanwhile, in the first to seventh embodiments referred to above, the magnetic head for the-magnetooptical disk is employed as the transducer. However, the transducer supporting apparatus of the present invention is not limited to the magnetic head for the magnetooptical disk but may also be applied to other transducers such as a magnetic head for a flexible disk and an optical head.

We claim:

1. A transducer apparatus for use with a recording medium set at a recording medium location, comprising:

a transducer for recording and reproducing information on a recording medium set at the recording medium location;

a slider coupled with said transducer and including a projecting member for protruding towards a recording medium set at the recording medium location, said projecting member defining a substantially rectilinearly extending contact region at which said slider is adapted to contact a recording medium, set at the recording medium location, along a contact line defined by a segment extending through a substantially longitudinal central axis of said contact region and bounded by opposite ends of said contact region;

wherein said transducer is outside of said contact region;

a pivot means for pivotally supporting said slider so as to pivot about a pivot axis substantially perpendicular to said contact line; and a loading means for depressing said projecting member against a recording medium set at said recording medium location.

2. A transducer apparatus as claimed in claim 1, wherein said transducer includes an input-output terminal for recording and reproducing information on a recording medium and is provided such that a projected image of the input-output terminal is disposed in the vicinity of a straight line including said contact line.

3. A transducer apparatus as claimed in claim 1, wherein said transducer comprises a magnetic head including a magnetic pole for imparting a magnetic field to a recording medium;

wherein said projecting member is designed to project further towards a recording medium set at the recording medium location than said magnetic pole.

4. A transducer apparatus as claimed in claim 3, wherein said magnetic pole is provided such that a center of a projected image of said magnetic pole is disposed substantially on a straight line including said contact line.

5. A transducer apparatus as claimed in claim 1, wherein said loading means is pivotally provided at least partially so as to be pivoted about said pivot axis such that said loading means and said pivot means are formed integrally with each other.

6. A transducer apparatus as claimed in claim 5, wherein said loading means includes a fixing portion to be fixed to a structure provided independently of a recording medium set at the recording medium location, a load generating portion for generating a force for depressing said projecting member against a recording medium set at the recording medium location and a rigid portion formed by a substantially rigid body;

said fixing portion, said load generating portion, said rigid portion and said slider are provided sequentially in this order;

a plane passing through a center of said contact line substantially and extending substantially perpendicularly to a recording medium set at the recording medium location is defined as a neutral plane; and said load generating portion is partially formed as at least one pair of load generating elements disposed at opposite sides of said neutral plane, respectively.

7. A transducer apparatus as claimed in claim 6, wherein at least two leaf springs are formed at a portion of said load generating portion so as to act as said load generating elements.

8. A transducer apparatus as claimed in claim 7, wherein said slider and said rigid portion of said loading means are formed integrally with each other by an identical material.

9. A transducer apparatus as claimed in claim 6, wherein said load generating elements are symmetrical with respect to said neutral plane.

10. A transducer apparatus as claimed in claim 9, wherein said slider and said rigid portion of said loading means are formed integrally with each other by an identical material.

11. A transducer apparatus as claimed in claim 5, wherein said loading means includes a fixing portion to be fixed to a structure provided independently of a recording medium set at the recording medium location, a load generating portion for generating a force for depressing said projecting member against a recording medium set at the recording medium location and a rigid portion formed by a substantially rigid body;

said fixing portion, said load generating portion, said rigid portion and said slider are provided sequentially in this order; and said load generating portion is formed with a reduced-width waist portion.

12. A transducer apparatus as claimed in claim 11, wherein said slider and said rigid portion of said loading means are formed integrally with each other by an identical material.

13. A transducer apparatus as claimed in claim 6, wherein said slider and said rigid portion of said loading means are formed integrally with each other by an identical material.

14. A transducer apparatus as claimed in claim 1, wherein said loading means includes a fixing portion to be fixed to a structure provided independently of a recording medium set at the recording medium location, a load generating portion for generating a force for depressing said projecting member against a recording medium set at the recording medium location and a rigid portion formed by a substantially rigid body; and said fixing portion, said load generating portion, said rigid portion and said slider are provided sequentially in this order.

15. A transducer apparatus as claimed in claim 1, wherein said projecting member is constituted by at least two projections and each of said projections forms a spot-like contact portion in said contact region and along said contact line.

16. A transducer apparatus as claimed in claim 15, wherein said contact portions are provided independently of each other and a contour of each of said contact portions is of a convex curved surface having no straight line.

17. A transducer apparatus as claimed in claim 16, wherein said slider is formed of resinous material.

18. A transducer apparatus as claimed in claim 15, wherein in the vicinity of each of said contact portions, each of said projections is substantially spherical.

19. A transducer apparatus as claimed in claim 18, wherein said slider is formed of resinous material.

20. A transducer apparatus as claimed in claim 15, wherein in the vicinity of each of said contact portions, each of said projections is of a substantially elliptic shape having a minor axis parallel to said contact line.

21. A transducer apparatus as claimed in claim 15, wherein said slider is formed of resinous material.

22. A transducer apparatus as claimed in claim 1, wherein said projecting member is constituted by two projections; and at least two leaf springs are formed at a portion of said load generating portion so as to act as said load generating elements.

23. A transducer apparatus as claimed in claim 1, wherein said slider is formed of resinous material.

24. A transducer apparatus for use with a recording medium, comprising:

a load beam;

a transducer, mounted on said load beam, for recording and reproducing information on a recording medium;

wherein said load beam includes a fixing portion to fix said load beam to a structure;

wherein said load beam includes a slider mounting portion at which said slider is mounted;

wherein said load beam includes a load generating portion connecting said slider mounting portion to said fixing portion for generating a load to press said slider in a pressing direction toward a recording medium;

wherein said load beam includes a pivot portion connecting said slider mounting portion to said load generating portion for allowing said slider mounting portion and said slider to pivot about a pivot axis;

wherein said slider includes a projecting portion for protruding towards a recording medium to contact a recording medium along a contact line in a contact region of said projecting portion; and wherein said transducer is outside of said contact region;

wherein said contact line is substantially perpendicular to said pivot axis.

25. A transducer apparatus as claimed in claim 24, wherein said slider includes an input-output terminal portion having a surface for facing in said pressing direction toward a recording medium; and said projecting portion of said slider projects farther in said pressing direction than said input-output terminal portion of said slider.

26. A transducer apparatus as claimed in claim 25, wherein said projecting portion has a surface for facing in said pressing direction toward a recording medium; and said surface of said projecting portion comprises a cylindrical surface.

27. A transducer apparatus as claimed in claim 25, wherein said projecting portion has a surface for facing in said pressing direction toward a recording medium; and said surface of said projecting portion comprises a pair of cylindrical surfaces disposed respectively on opposite sides of said surface of said input-output terminal portion.

28. A transducer apparatus as claimed in claim 25, wherein said projecting portion has a surface for facing in said pressing direction toward a recording medium; and said surface of said projecting portion comprises a pair of cylindrical surfaces.

29. A transducer apparatus as claimed in claim 24, wherein said projecting portion has a surface for facing in said pressing direction toward a recording medium; and said surface of said projecting portion comprises a cylindrical surface.

30. A transducer apparatus as claimed in claim 24, wherein said slider includes an input-output terminal portion having a surface for facing in said pressing direction toward a recording medium;

said projecting portion has a surface for facing in said pressing direction toward a recording medium; and said surface of said projecting portion comprises a pair of cylindrical surfaces disposed respectively on opposite sides of said surface of said input-output terminal portion.

31. A transducer apparatus as claimed in claim 24, wherein said projecting portion has a surface for facing in said pressing direction toward a recording medium; and said surface of said projecting portion comprises a pair of cylindrical surfaces.

* * * * *